United States Patent
Ogura et al.

(12)
(10) Patent No.: US 9,738,196 B2
(45) Date of Patent: Aug. 22, 2017

(54) BASE NET AND SEAT STRUCTURE

(71) Applicant: Delta Tooling Co., Ltd., Hiroshima-shi (JP)

(72) Inventors: Yumi Ogura, Hiroshima (JP); Etsunori Fujita, Hiroshima (JP); Seiji Kawasaki, Hiroshima (JP); Shogo Inoue, Hiroshima (JP); Yuki Arita, Hiroshima (JE); Eiji Sugimoto, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 321 days.

(21) Appl. No.: 14/360,414

(22) PCT Filed: Nov. 23, 2012

(86) PCT No.: PCT/JP2012/080397
§ 371 (c)(1),
(2) Date: May 23, 2014

(87) PCT Pub. No.: WO2013/077437
PCT Pub. Date: May 30, 2013

(65) Prior Publication Data
US 2014/0339878 A1  Nov. 20, 2014

(30) Foreign Application Priority Data
Nov. 25, 2011 (JP) ................................. 2011-258352

(51) Int. Cl.
*B60N 2/70* (2006.01)
*B60N 2/66* (2006.01)

(52) U.S. Cl.
CPC .............. *B60N 2/7011* (2013.01); *B60N 2/66* (2013.01); *B60N 2/70* (2013.01)

(58) Field of Classification Search
CPC ........... B60N 2/7011; B60N 2/70; B60N 2/66
(Continued)

(56) References Cited

U.S. PATENT DOCUMENTS 7,275,793 B2 * 10/2007 Fujita ................... B60N 2/70
297/452.48 X
7,600,821 B2 * 10/2009 Yasuda ................... B60N 2/70
297/452.29
(Continued)

FOREIGN PATENT DOCUMENTS

EP   1 193 117 A1   4/2002
EP   1 348 357 A2   10/2003
(Continued)

OTHER PUBLICATIONS

Extended European Search Report issued Mar. 24, 2015 in Patent Application No. 12851653.1.
(Continued)

*Primary Examiner* — Anthony D Barfield
(74) *Attorney, Agent, or Firm* — Oblon, McClelland, Maier & Neustadt, L.L.P.

(57) ABSTRACT

A base net for a back is formed from a three-dimensional stereoscopic knit, and has a configuration in which seams for bringing a pair of ground knitted fabrics thereof to close to each other in a thickness direction are partially provided, predetermined preliminary compression is applied in the thickness direction by the seams, and thereby residual stress is generated in a surface direction (stretching direction). Therefore, stiffness is partially increased by partial improvement in residual stress, and consequently a human body with extreme roughness is supported by nearly uniform pressure. Thus, in spite of a simple configuration in which the seams are provided in desired regions, posture supportiveness and body pressure dispersiveness can be improved. Further, by arbitrarily adjusting the formation positions of the seams, the pressure distribution is adjusted, thereby making it possible to easily control the vibration mode to desired setting, and easily improve vibration absorbency.

11 Claims, 21 Drawing Sheets

(58) Field of Classification Search
USPC .................................................. 297/452.48
See application file for complete search history.

(56) References Cited

U.S. PATENT DOCUMENTS

| | | |
|---|---|---|
| 2002/0060493 A1 | 5/2002 | Nishino et al. |
| 2003/0193231 A1 | 10/2003 | Fujita et al. |
| 2006/0279119 A1 | 12/2006 | Fujita et al. |
| 2006/0279120 A1 | 12/2006 | Fujita et al. |
| 2008/0079299 A1 | 4/2008 | Jackson |

FOREIGN PATENT DOCUMENTS

| | | |
|---|---|---|
| JP | 2004 188164 | 7/2004 |
| JP | 2006 345952 | 12/2006 |
| JP | 2006 345953 | 12/2006 |
| JP | 2011-224049 A | 11/2011 |

OTHER PUBLICATIONS

International Search Report Issued Feb. 26, 2013 in PCT/JP12/080397 Filed Nov. 23, 2012.

* cited by examiner (a) ( units :g/cm² )

Assembled state (b) ( units :g/cm² )

Base net for back + pelvis supporting member + S-spring + S-spring supporting plate (c) ( units :g/cm² )

Base net for back + S-spring + S-spring supporting plate (d) ( units :g/cm² )

Base net for back only (a) ( units :g/cm² )

Assembled state (b) ( units :g/cm² )

Base net for back + pelvis supporting member + S-spring + S-spring supporting plate (c) ( units :g/cm² )

Base net for back + S-spring + S-spring supporting plate (d) ( units :g/cm² )

Base net for back only

US 9,738,196 B2

BASE NET AND SEAT STRUCTURE

TECHNICAL FIELD

The present invention relates to a base net and a seat structure, and in particular, relates to a base net and seat structure which are suitable for seats of transportation equipment such as vehicles, airplanes, and trains.

BACKGROUND ART

The present applicant, in order to reduce the weight of the seat structure, proposes a variety of seat structures using three-dimensionally knitted fabrics and two-dimensional fabrics as the base net for the cushion frame and the back frame. Patent Documents 1-3 describe configurations in which certain cushion characteristics are applied by stretching the base net via a torsion bar, and compared to the conventional so-called "placement structure" in which a urethane material of a certain thickness is installed on top of a cushion pan, weight is reduced while posture supportability, body pressure dispersibility, and vibration absorbing characteristics, etc. are improved.

PRIOR ART DOCUMENTS

Patent Literature

Patent Document 1: Japanese Unexamined Patent Application Publication No. 2004-188164
Patent Document 2: Japanese Unexamined Patent Application Publication No 2006-345952
Patent Document 3: Japanese Unexamined Patent Application Publication No. 2006-345953

SUMMARY OF INVENTION

Problems to be Solved by the Invention

Incidentally, characteristics such as posture supportability, body pressure dispersibility, and energy absorbency are greatly related to the characteristics of the base net. The characteristics of the base net are determined by factors such as the knitting structure, the material of the thread, the diameter, and thickness. Accordingly, it is necessary for a seat manufacturer to prepare, as the base net, a material (a three-dimensionally knitted fabric or two-dimensional fabrics, etc.) that is capable of achieving the intended characteristics. However, if the characteristics desired by the seat manufacturer cannot be satisfied with commercially available materials, it becomes necessary to specially order a material for exclusive use. This increases the cost. For this reason, after obtaining a material, it is desirable that with processing performed by the seat manufacturer, it is possible to easily control the characteristics thereof at a low cost.

In addition, for example, in cases when focus is placed on posture supportability for the base net of transportation equipment, a material with a comparatively lower elasticity is selected. In such case, when a 2-axis woven fabric or a three-dimensionally knitted fabric is selected, in relation to the roll direction which is the direction the material is rolled in its original state or the widthwise direction which is the direction perpendicular to the roll direction, depending on the abovementioned factors such as the knitting structure and the material of the threads, it is comparatively easy to control the material such that it is of a desired elongation rate. However, with the diagonal direction in relation to the roll direction or the widthwise direction, it is difficult to control the material to have a desired elongation rate by such as adjusting the knitting structure. For this reason, in cases when focus is placed on posture supportability, although a 3-axis woven fabric or 4-axis woven fabric having little elongation in the diagonal direction may be selected, 3-axis woven fabrics and 4-axis woven fabrics cost more and increase the weight as well.

The present invention has been devised in view of the above and the object thereof is to provide a base net capable of being controlled to a desired characteristic by partially increasing the rigidity thereof with easy and low cost processing in order to improve posture supportability, body pressure dispersibility, and energy absorbency, etc. and a seat structure that makes use of said base net.

Means for Solving the Problem

In order to resolve the abovementioned problem, the base net of the present invention is a base net which is covered by a surface layer cushion in the seat back portion or seat cushion portion of a seat structure, supported by being stretched across a back frame or a cushion frame, formed of a three-dimensionally knitted fabric formed by joining a pair of grand knitted fabrics placed separately apart each other with a connecting yarn, partially provided with a sewn seam which brings the pair of grand knitted fabrics sandwiching said connecting yarn closer to each other in the thickness direction, and characterized by being of a structure in which a certain pre-compression is applied in the thickness direction due to said seam to generate residual stress in the direction in which the base net is stretched across.

Said base net may be of a configuration having said seam provided at a position which includes the section that supports a region from a pelvis to a lumbar and the base net is supported by being stretched across said back frame. In addition, said base net may be of a configuration having said seam provided in at least one of a position that includes a certain range where the substantial center thereof is the section supporting the ischial tuberosity and a position that supports the thigh region and the base net is supported by being stretched across said cushion frame.

It is preferable that said seam is provided in and along the diagonal direction in relation to the widthwise direction and the roll direction of said three-dimensionally knitted fabric. It is also preferable that one or more sets of a combination of two said seams substantially parallel with a certain interval are formed. It is also preferable that two or more sets of said combination of two substantially parallel seams are formed and both are intersecting in at least one point. It is also preferable that said sets of combination of two substantially parallel seams are formed in substantially V-shaped, substantially X-shaped, or substantially rhombic lattice-shaped. It is also preferable that said seam is formed by being sewn in a unicursal manner. It is also preferable that the thread which forms said seam is an elastic thread. In place of said three-dimensionally knitted fabric, it is possible to have a configuration which uses a fabric of a layered structure in which one or more other layers are layered on top of a two-dimensional fabric or a three-dimensionally knitted fabric. In place of said three-dimensionally knitted fabric, it is possible to have a configuration which uses a two-dimensional fabric.

In addition, the seat structure of the present invention is a seat structure provided with a seat back portion and a seat cushion portion and characterized by said base net being used as the base net which is supported by being stretched across the back frame of said back portion. In the rear side of the base net which is stretched across the back frame of said seat back portion, it is preferable that the configuration is such that has a planar spring member laid across the widthwise direction in a position that is lower than the center portion of said back frame in the vertical direction. It is also preferable that the configuration is such that is provided with a front surface cover unit that covers the front surface of said planar spring member and further has a pelvis supporting member which is elastically supported by said planar spring member. It is also preferable that a supporting plate which supports said pelvis supporting member with a surface and is also the point of action of the rotary motion of said pelvis supporting member is provided on said planar spring member with certain intervals on the left and right sides of the center line of said seat back portion. Furthermore, the seat structure of the present invention is a seat structure provided with a seat back portion and a seat cushion portion and characterized by said base net being used as the base net which is supported by being stretched across the back frame of said seat back portion.

Effects of Invention

The present invention is a configuration in which seams, that bring a pair of grand knitted fabrics of a three-dimensionally knitted fabrics closer to each other in the thickness direction, are partially provided and a certain pre-compression is applied in the thickness direction due to the seam to generate residual stress in the planar direction (the direction in which the fabric is stretched across). For this reason, due to improvement of the partial residual stress, rigidity is partially increased, and as a result, a human body having numerous uneven surfaces is supported with a pressure that is close to being even, therefore while being of a simple configuration in which a seam is provided in the desired section, it is possible to increase posture supportability and body pressure dispersibility. In addition, by optionally adjusting the position in which the seam is formed, it is possible to adjust the pressure distribution to easily control the vibration mode to a desired configuration and easily realize improvement of vibration absorbency.

In addition, in the case of the base net provided on the seat back portion, it is preferable that the seam is provided in an area near the section corresponding to the pelvis to lumbar region. With this, it is possible to securely support the region from the pelvis to the lumbar of the seat occupant with a relatively greater supporting strength regardless of being of a minimum necessary supporting surface area, and while making it possible to efficiently increase posture supportability, in sections other than where the seam is located, as relatively larger elongation volumes can be ensured, it is possible to increase vibration absorbency and energy absorbency. In the case of the base net provided on the seat cushion portion, it is preferable that the seam is provided in at least either a position that includes a certain range having the section which supports the ischial tuberosity as its substantial center or a section that supports the thigh region. For the case provided near the ischial tuberosity, it is possible to use anything that is less expensive while being capable of increasing the supporting strength near the ischial tuberosity and suppressing the bottoming feel thus contributing to a reduction in the overall cost of the seat structure. In cases when a section that supports the thigh region is provided, similarly while bottoming can be prevented, such can also be useful in suppressing the buttocks from sliding forward.

In addition, even if a three-dimensionally knitted fabric is not used, it is possible to realize similar effects with a fabric of a layered structure where one or more other layers are layered on top of a two-dimensional fabric or by providing seams at desirable sections of a two-dimensional fabric.

DESCRIPTION OF EMBODIMENTS

Figure 1:
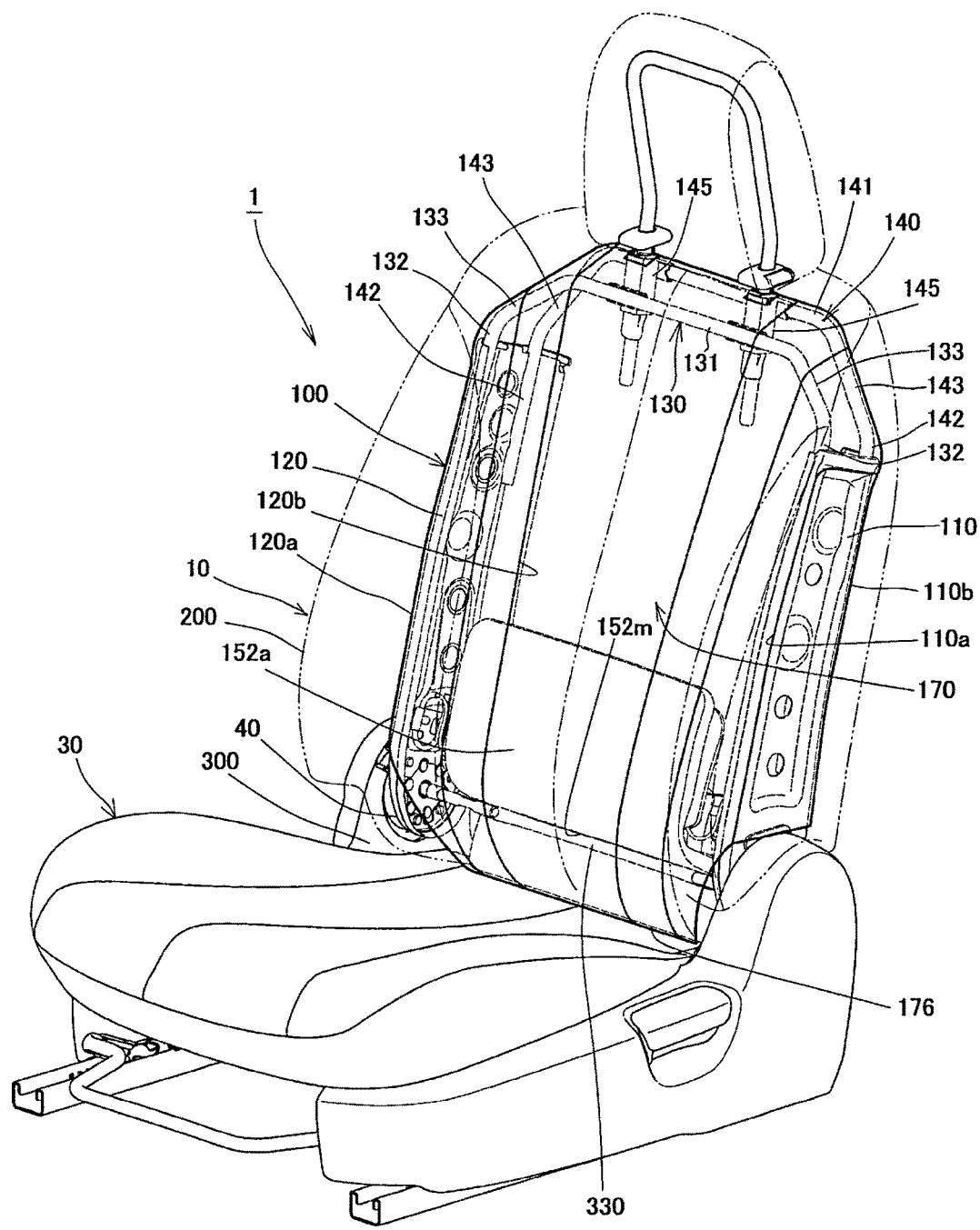
FIG. 1 is a perspective view, as viewed from the front side, illustrating the internal structure of a seat structure according to an embodiment of the present invention.

The present invention will be explained below in further detail based on the embodiment illustrated in the drawings.

As illustrated in these drawings, seat structure (1) of the present embodiment has seat back portion (10) and seat cushion portion (30).

Back frame (100) which configures seat back portion (10), as illustrated in FIG. 1 through FIG. 7, comprises a pair of side frames (110, 120) placed with a certain interval, upper frames (130, 140) placed between the upper section of the side frames (110, 120) (hereinafter may be referred to as "first upper frame (130)" and "second upper frame (140)"), and lower frame (150) placed between the lower section of the side frames (110, 120). Furthermore, to the rear portion of the side frame of cushion frame (300) of seat cushion portion (30), the lower portions of side frames (110, 120) of back frame (100) are coupled via reclining mechanism (40) and seat back portion (10) is provided to be capable of being tilted forwards or backwards in relation to seat cushion portion (30).

Figure 5:
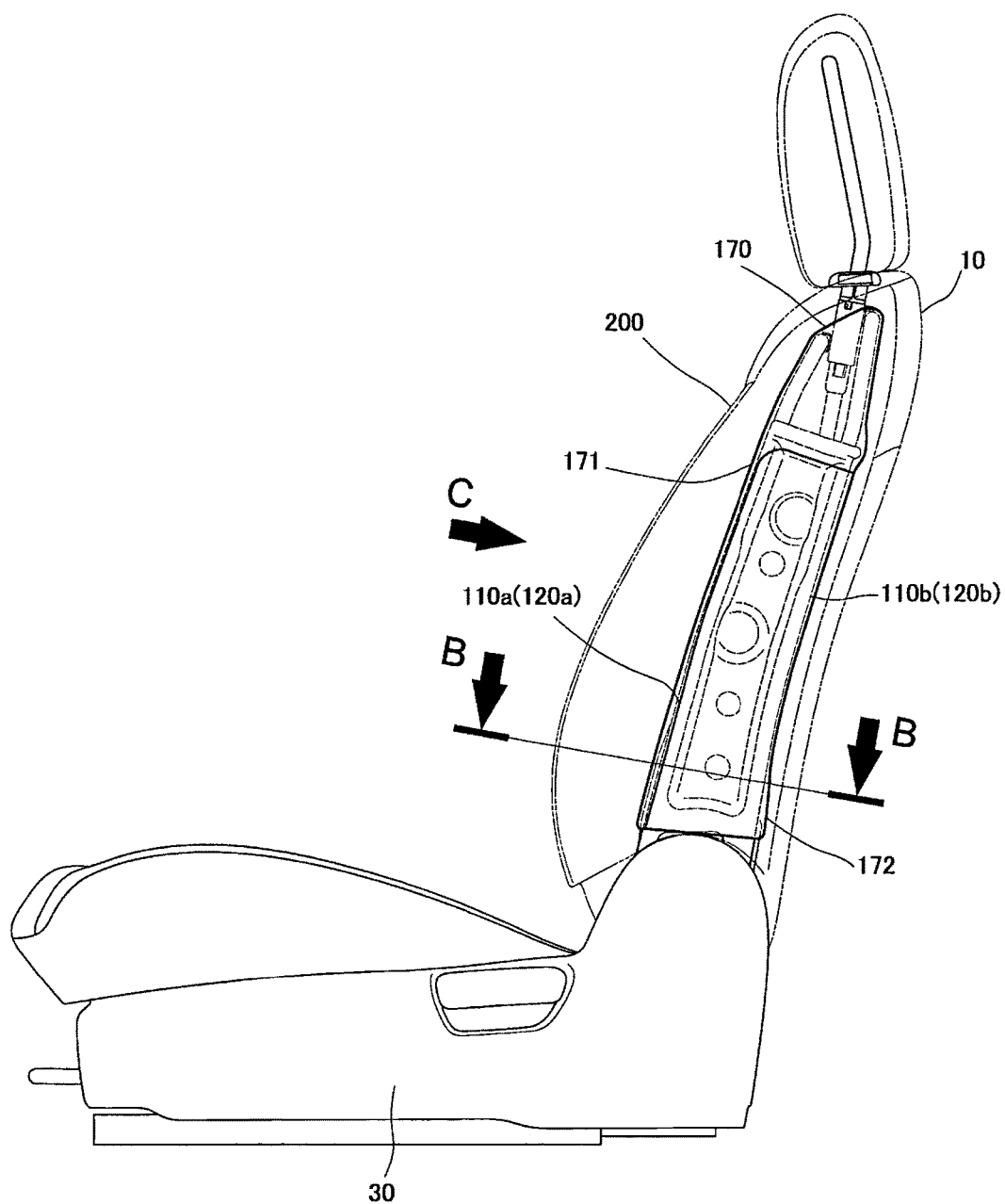
FIG. 5 is a side view of FIG. 1.

Each side frame (110, 120) of back frame (100) is formed of a plate-shaped member of a certain width and are placed such that the widthwise direction of these are faced along the approximately front-rear direction. More specifically, as illustrated in FIG. 5, the width of these comprises a shape where the width slightly broadens from the upper side to the lower side, and when viewed from the side in a state where the tilt of back frame (100) is substantially 90 degrees in relation to cushion frame (300), front edges (110a, 120a) are of a shape along a line that is tilted in the direction that slightly bulges out towards the front from the upper side to the lower side.

First upper frame (130) and second upper frame (140) consist of a pipe material that is formed in a substantially U-shape with the side of its open end facing downwards and comprise lateral frame units (131, 141) which extend outwards in a substantially horizontal manner from the center, and vertical frame units (132, 142) on the side of the open end. In addition, the areas between each of the lateral frame units (131, 141) and the vertical frame units (132, 142) are provided with diagonal frame units (133, 143) which extend diagonally downward from each end of the lateral frame units (131, 141) and connect to the vertical frame units (132, 142). Furthermore, with first upper frame (130), vertical frame unit (132) is coupled to the side of front edges (110a, 120a) of side frames (110, 120), and with second upper frame (140), vertical frame unit (142) is coupled to the side of rear edges (110b, 120b). For this configuration, first upper frame 130 and second upper frame 140 are arranged with intervals in the front and back, and in the center portion of lateral frame units (131, 141), headrest supporting unit (145) is provided between lateral frame units (131, 141).

Figure 2:
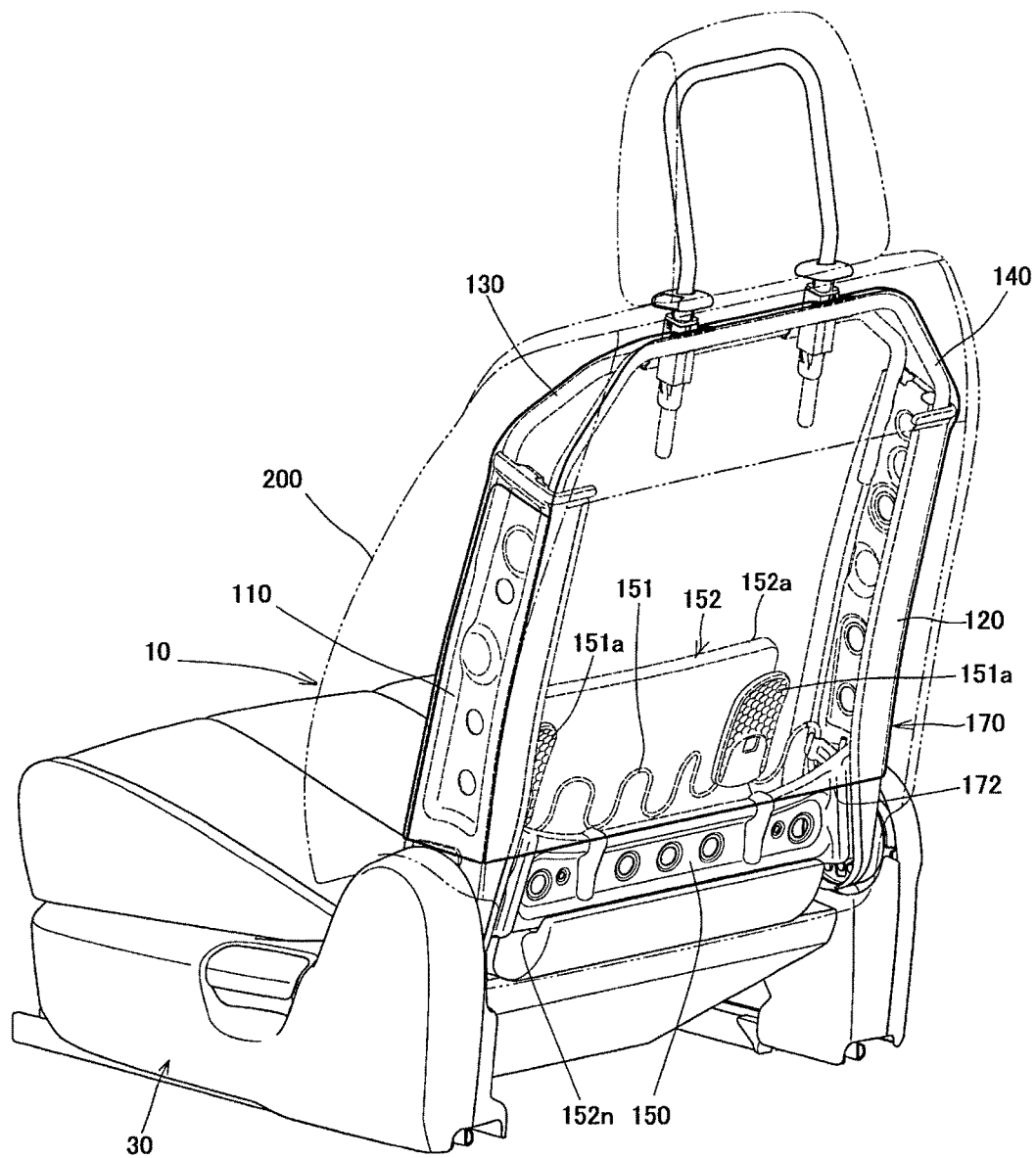
FIG. 2 is a perspective view, as viewed from the rear side, of FIG. 1.

In a position slightly above lower frame (150), in other words, in the position corresponding to the area around the pelvis to lumbar region of the seat occupant, near the side of the front edge of side frames (110, 120), S-spring (151) is laid across as a planar spring member (refer to FIG. 2). S-spring (151) contacts the area around from the pelvis to the lumbar region of the seat occupant and while generating a stroked feel towards the front-rear direction, also creates resilience in relation to rotary and reciprocating motions generated on the pelvis. It is preferable that S-spring (151) is provided in an arched shape where the center portion in the widthwise direction is bulged either frontwards or backwards. When this is formed in an arched shape bulging frontwards, it becomes easier for the occupant to feel the stroke, and when this is formed in an arch shape bulging backwards, the fit feeling along the back of the person is improved. As there is the issue of the preference of the seat occupant, which configuration will be used, for example, may be selected depending on the type (sedan type, sports type, etc.) of the vehicle, etc. in which the seat structure of the present embodiment will be installed. Due to being provided with S-spring (151), by rotating backwards centered on the side of the edge on the lower end when the side of the edge on the upper end is pressed against, the pelvis can be supported with the reactive force of the spring from the diagonal bottom towards a diagonally upward direction. In addition, when an inertial force is input in the lateral direction, due to a relatively small spring constant, a stroke of a small reactive force is generated, and while the pelvis is securely supported while a rotary motion is generated, resilience is created in relation to the movement generated by the pelvis. It should be noted that, in order to make it easier for the supporting pressure to function from the diagonal bottom towards a diagonally upward direction, it is preferable that S-spring (151), as in this embodiment, is provided integrally with pelvis supporting member (152).

Pelvis supporting member (152), as illustrated in FIG. 1 through FIG. 7, is formed from a beaded foam, etc. processed into a substantially L-shaped form when viewed from the side. When viewed from the front, this is formed to be of a width that is narrower than S-spring (151) and has front surface cover unit (152a) which is placed on the side of the front surface of S-spring (151). Near the angled portion of pelvis supporting member (152) that is substantially L-shaped, outer surface groove (152m) is formed in the widthwise direction, and on the side of the inner surface that is further towards the backwards section than this outer surface groove (152m), groove (152n) that engages to lower frame (150) is formed. Furthermore, outer surface groove (152m) is placed along the side of the rear section of coupling rod (330) between the recliners. When the seat occupant applies a load backwards and front surface cover unit (152a) rotates backwards in the diagonally downward direction, the reactive force of S-spring (151) functions to press and support the section from the pelvis to lumbar region of the seat occupant from the diagonal bottom towards a diagonally upward direction, thus increasing the supportive feel more than cases when only being supported by S-spring (151). In addition, it is preferable that near both end sections of S-spring (151), supporting plate (S-spring supporting plate) (151a) is attached. When front surface cover unit (152a) of pelvis supporting member (152) is subject to a rotary motion in the backwards direction, the S-spring supporting plate (151a) becomes the point of action, and due to being supported with a surface by the S-spring supporting plate (151a), it is possible to further increase the supportive feel.

On side frames (110, 120) and first and second upper frames (130, 140) of back frame (100), the base net (170) of the present embodiment (hereinafter referred to as the "base net for the back") is supported. The base net for the back (170) is formed substantially in the shape of a bag and while having front surface covering unit (171) which covers the side of the front surface of back frame (100), also has rear surface covering unit (172) which covers the side of the rear surface.

Front surface covering unit (171) has a size that reaches from each lateral frame unit (131) of first upper frame (130) to the position corresponding to lower frame (150). Front surface covering unit (171) has downward protrusion (176) which extends in the downwards direction and this downward protrusion (176) is arranged to be wrapped around the lower side of pelvis supporting member (152) (refer to FIG. 7). Rear surface covering unit (172) goes around the side of the rear edge of second upper frame (140) and further extends to reach the area near lower frame (150) (refer to FIG. 2 and FIG. 5).

By stretching the base net for the back (170) across in such manner, the section towards side frames (110, 120) corresponding to the side section of the body of the seat occupant becomes a small section deflected to the front and back and thus it makes it easier for the section corresponding to the spine along the center line of the base net for the back (170) to deflect to the front and back. Due to this, when an inertial force functions in the left and right directions when cornering, it becomes easier for a rotary motion to occur centered on the spine. Upon the occurrence of a rotary motion occurs, if the section along the center line deflects towards the front and back, the supporting pressure of S-spring (151) and pelvis supporting member (152) functions. Due to this, the body shifting in the left and right directions can be prevented.

Although the base net for the back (170) may be formed of a three-dimensionally knitted fabric, a two-dimensional fabric, or a fabric of a layered structure where one or more other layers are layered on top of a two-dimensional fabric, it is preferable to use a three-dimensionally knitted fabric having excellent resilience in the tensile direction. It should be noted that a three-dimensionally knitted fabric is, for example, as disclosed in Japanese Unexamined Patent Application Publication No. 2002-331603 and Japanese Unexamined Patent Application Publication No. 2003-182427, etc., a knitted fabric of a stereoscopic and three-dimensional structure having a pair of grand knitted fabrics placed separately apart each other and a great number of connecting yarn that join the pair of grand knitted fabrics by reciprocating between these. In addition, in cases when a two-dimensional fabric is to be used, it is preferable to use the fabric disclosed in Japanese Unexamined Patent Application Publication No. 2008-259885 by the present applicant. With this two-dimensional fabric, either the warp or the weft is configured of an elastic thread, the other is configured of a normal thread having a lower elasticity that the elastic thread, and when a test piece cut to be 200 mm in length and 50 mm in width, the section up to 50 mm towards the inner side from each end section in the lengthwise direction thereof is set as a grabbing margin, and as the tensile characteristic measured by applying a tensile force of 50 mm/min, it displays a soft spring characteristic when pulled along the direction in which the elastic thread has been placed, also displays a linear spring characteristic when pulled from the direction in which the normal thread has been placed. The two-dimensional fabric is characterized in that as its spring constant in a state of being stretch across back frame (100), determined from the load-deflection characteristics when pressure is substantially vertically applied to the planar direction, the spring constant determined from the load-deflection characteristics when pressure is applied with a compression plate of a diameter of 98 mm is higher than the spring constant determined from load-deflection characteristics when pressure is applied with a compression plate of a diameter of 30 mm. With this configuration, the fabric has characteristics similar to the load characteristics of human muscle making it possible to realize an increase of fit feeling and improve posture supportability, etc. In cases when another layer is layered on top of a two-dimensional fabric, it is possible to use a fabric of two-layers where a thin urethane material or non-woven fabric, etc. is layered, of a fabric of three layers where a thin urethane material or non-woven fabric, etc. is sandwiched between two sheets of a two-dimensional fabric.

Figure 3:
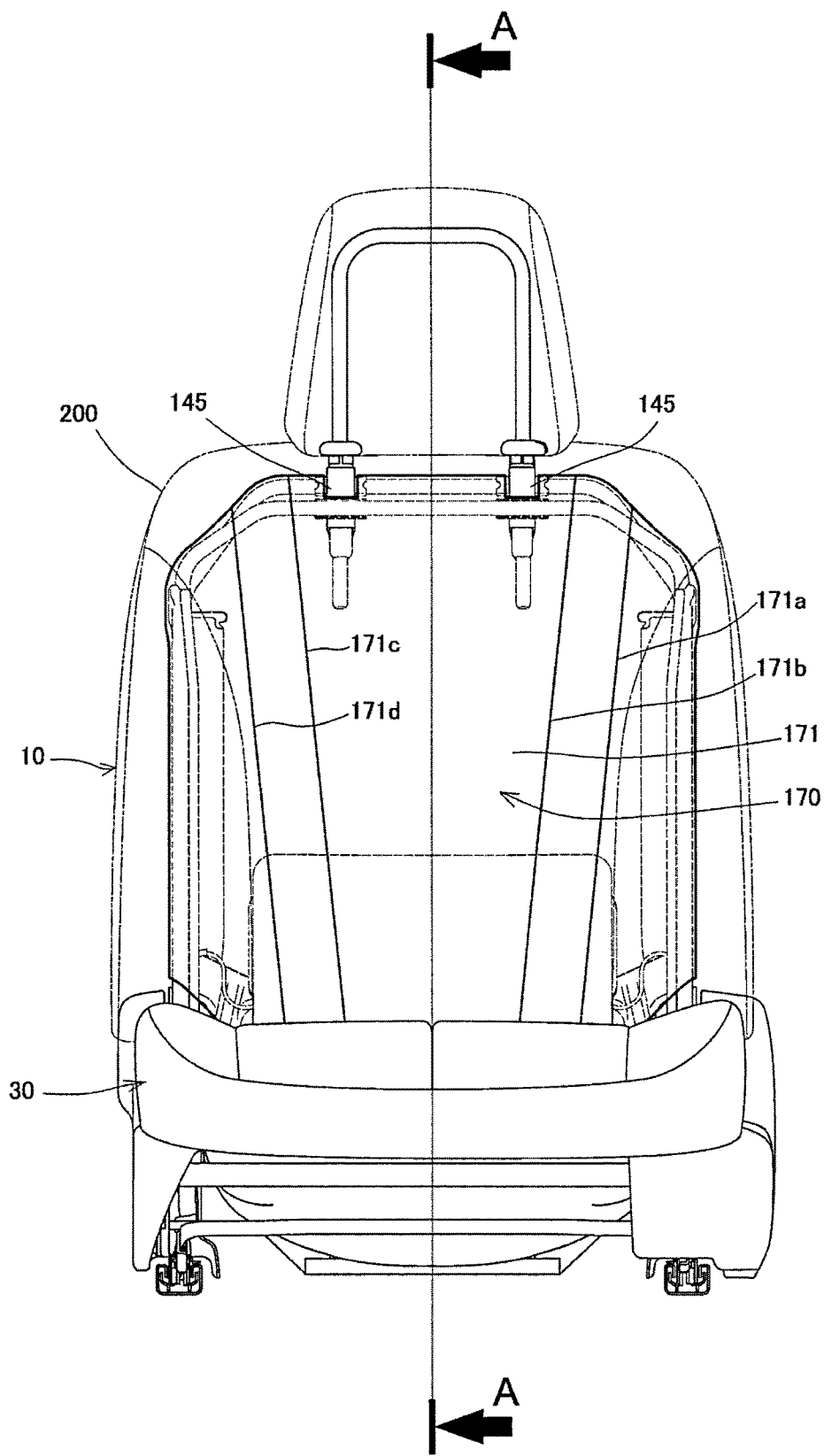
FIG. 3 is a frontal view of FIG. 1.
Figure 4:
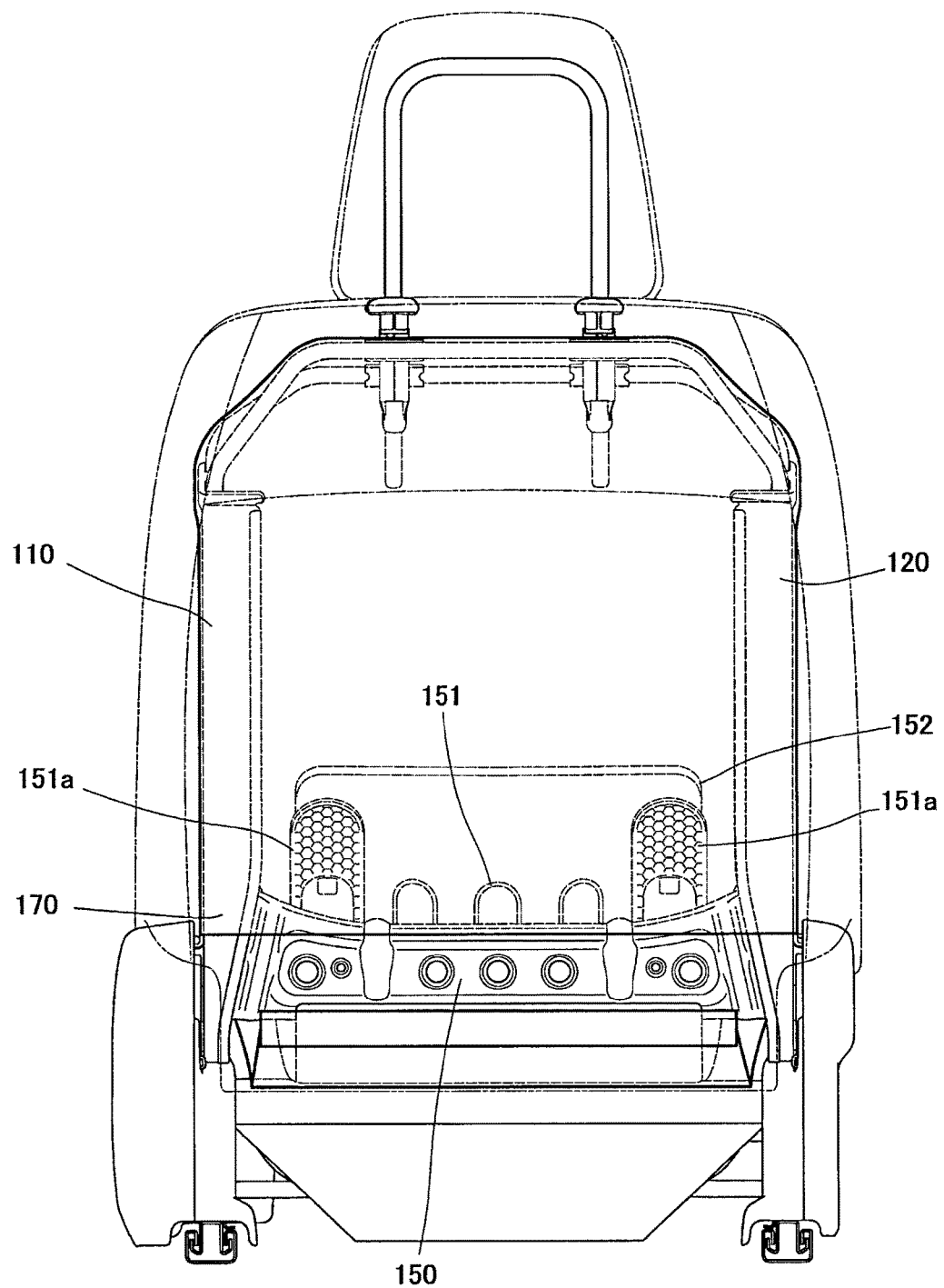
FIG. 4 is a rear view of FIG. 1.
Figure 8:
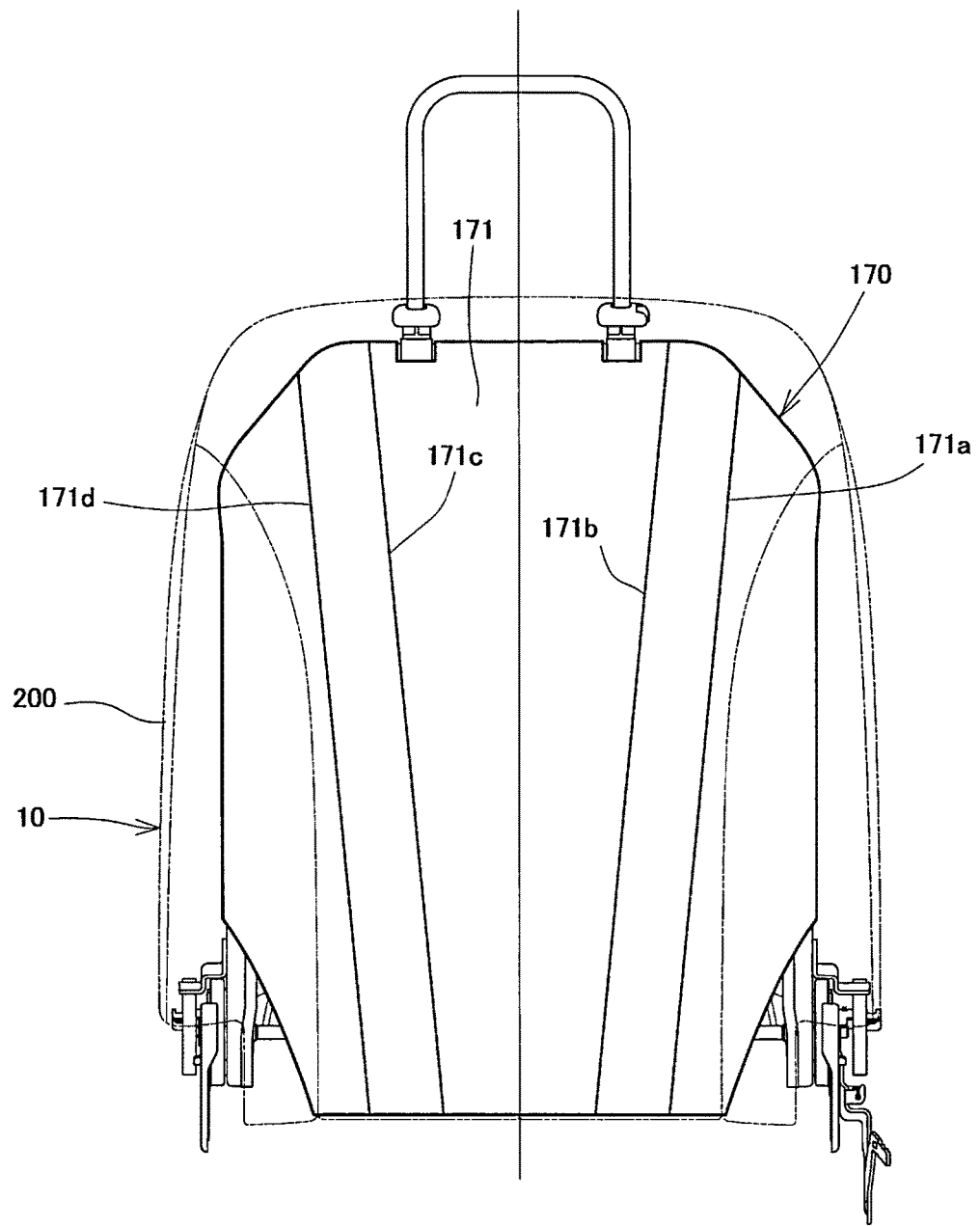
FIG. 8 is a drawing illustrating the base net for the back as viewed from the direction of arrow C in FIG. 3 and is a drawing that illustrates an example of a substantially V-shaped seam being formed.

Here, on front surface cover unit (171) of the base net for the back (170), as illustrated in FIG. 3 and FIG. 8, seams (171a-171d) are provided. These, when viewed from the front surface, are provided symmetrically on both sides of the center line along the center in the widthwise direction, and with a set of two seams (171a, 171b) provided on one side of the center line from the top end to the bottom end to be substantially parallel to each other and another set of two seams (171c, 171d) provided on the other side of the center line from the top end to the bottom end to be substantially parallel to each other, such to create a substantially V-shaped form, these are formed such that the intervals become larger towards the side of the upper section. Seams (171a-171d) are formed by sewing front surface cover unit (171) of the base net for the back (170) with for example a No. 8 thread. In cases when the base net for the back (170) is a three-dimensionally knitted fabric, by such seams (171a-171d) being formed partially, in the corresponding sections the pair of grand knitted fabrics on the two sides of the connecting yarn are brought closer to each other in the thickness direction. For this reason, pre-compression is applied along the line on which seams (171a-171d) have been formed, and residual stress is generated in the planar direction (the direction in which the fabric is stretched across). Due to this residual stress, as mentioned in the above, rigidity is partially increased, and as a result, a human body having numerous uneven surfaces is supported with a pressure that is close to being even.

These functions and effects in the case where seams (171a-171d) are implemented on a three-dimensionally knitted fabric are similarly displayed even with a fabric of two-layers where a thin urethane material or non-woven fabric, etc. is layered on top of a two-dimensional fabric, or a fabric of three layers where a thin urethane material or non-woven fabric, etc. is sandwiched between two sheets of a two-dimensional fabric. In addition, in any case, when tension is applied in the direction along the sew line of seams (171a-171d), as rupturing of the threads forming seams (171a-171d) will occur, energy absorbency of when being subject to an impact equal to or greater than a certain amount will be improved. These functions and effects are similar in cases where the seams are formed on a configuration consisting only of a two-dimensional fabric. As tensile characteristics, etc. required of the base net for the back (170), even if standards for the requirements cannot be satisfied in its original state as a material, by sewing the threads and providing such seams (171a-171d), it becomes possible to satisfy the standards for certain requirements. In cases when a material having weak characteristics in its original state as a material is used, of the characteristics required of the base net for the back (170), in particular, it is often the case that standards for requirements cannot be satisfied for the strength (tensile characteristic) in the diagonal direction. Here, it is preferable that seams (171a-171d) are formed in and along the diagonal direction in relation to the widthwise direction or the roll direction of the material rolled in its original state as this especially increases the energy absorbency in the corresponding direction. Accordingly, a material of a lower rigidity can be utilized as the base net for the back (170) thus contributing to a reduction of costs.

The number of seam lines formed by sewing the thread and the positions in which these are formed are optional and although this may be a single line, it is further preferable that a plurality of seams are formed in the diagonal direction with two parallel lines as one set. As forms of such, apart from the abovementioned example of a substantially V-shaped form, for example, as illustrated in FIG. 9, seams (171e-171h) may be formed to intersect in a substantially X-shaped manner when viewed from the front, or as illustrated in FIG. 10, seams (171i-171m) may be formed to create a substantially rhombic lattice-shaped manner where when viewed form the front, the seams of substantially rhombic shapes are adjacent and continuous.

Figure 9:
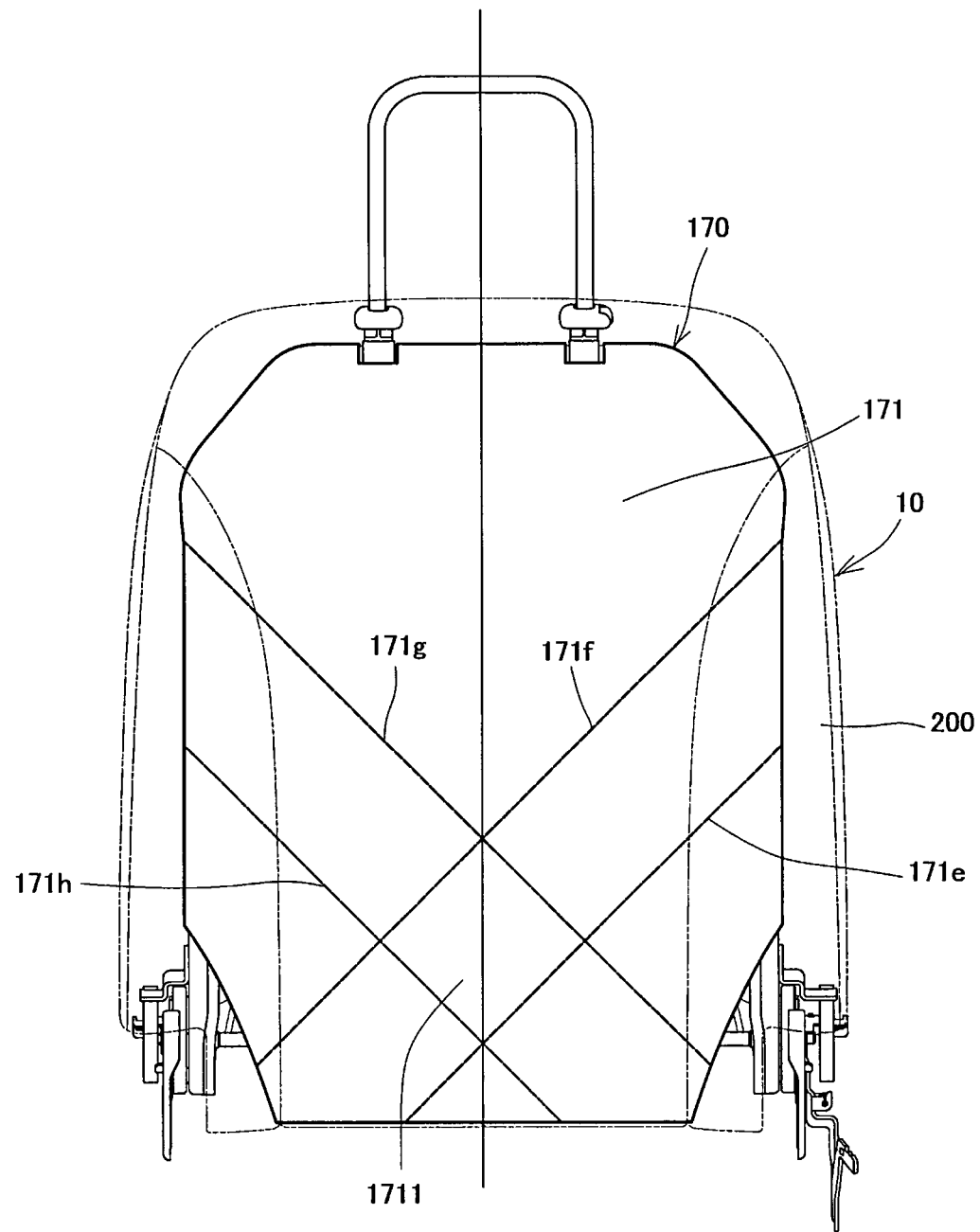
FIG. 9 is a drawing illustrating the base net for the back as viewed from the direction of arrow C in FIG. 3 and is a drawing that illustrates an example of a substantially X-shaped seam being formed.
Figure 10:
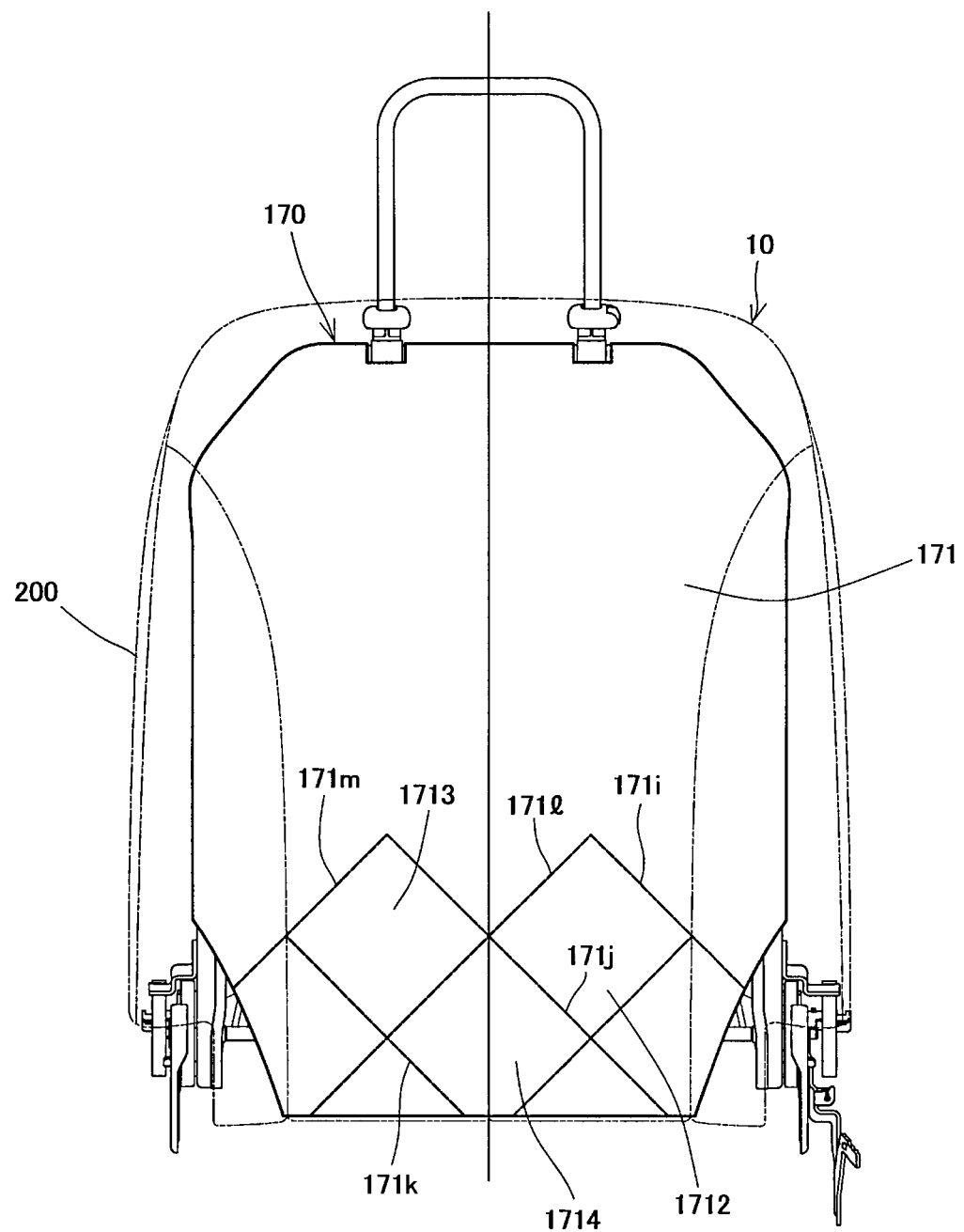
FIG. 10 is a drawing illustrating the base net for the back as viewed from the direction of arrow C in FIG. 3 and is a drawing that illustrates an example of a substantially rhombic lattice-shaped seam being formed.

In addition, it is preferable that intersecting portion (1711) of seams (171e-171h) in cases when substantially X-shaped seams are formed as illustrated in FIG. 9 and intersecting portions (1712, 1713, 1714) of seams (171i-171m) of a substantially rhombic lattice as illustrated in FIG. 10 are provided such that they are in a section corresponding to the area from pelvis to lumbar region of the seat occupant. As intersecting portions (1711-1714) are surrounded on four sides by the seams, while the strength in the tensile direction of the corresponding section is increased, rigidity in the thickness direction is also increased, thus increasing the supportability of the pelvis to lumbar region and improving posture supportability. In addition, the strength of intersection portions (1711-1714) is increased, and as the strength of the section above this becomes relatively lower, when subject to a large impact, while receiving the impact load of the seat occupant with these intersecting portions (1711-1714), when the body of the seat occupant tries to shift further upwards, the threads of the upper section start to rupture making it easier for energy to be absorbed.

It should be noted that if each of the abovementioned seams are of a pattern that may be sewn in a unicursal manner, this makes it possible for the seams to be sewn with an automated sewing machine thus enabling implementation at a further lower cost. In addition, although cotton threads or synthetic threads, etc. may be used for the threads that form the seams, in order to improve the tensile characteristic, it is preferable that an elastic thread is used.

Figure 6:
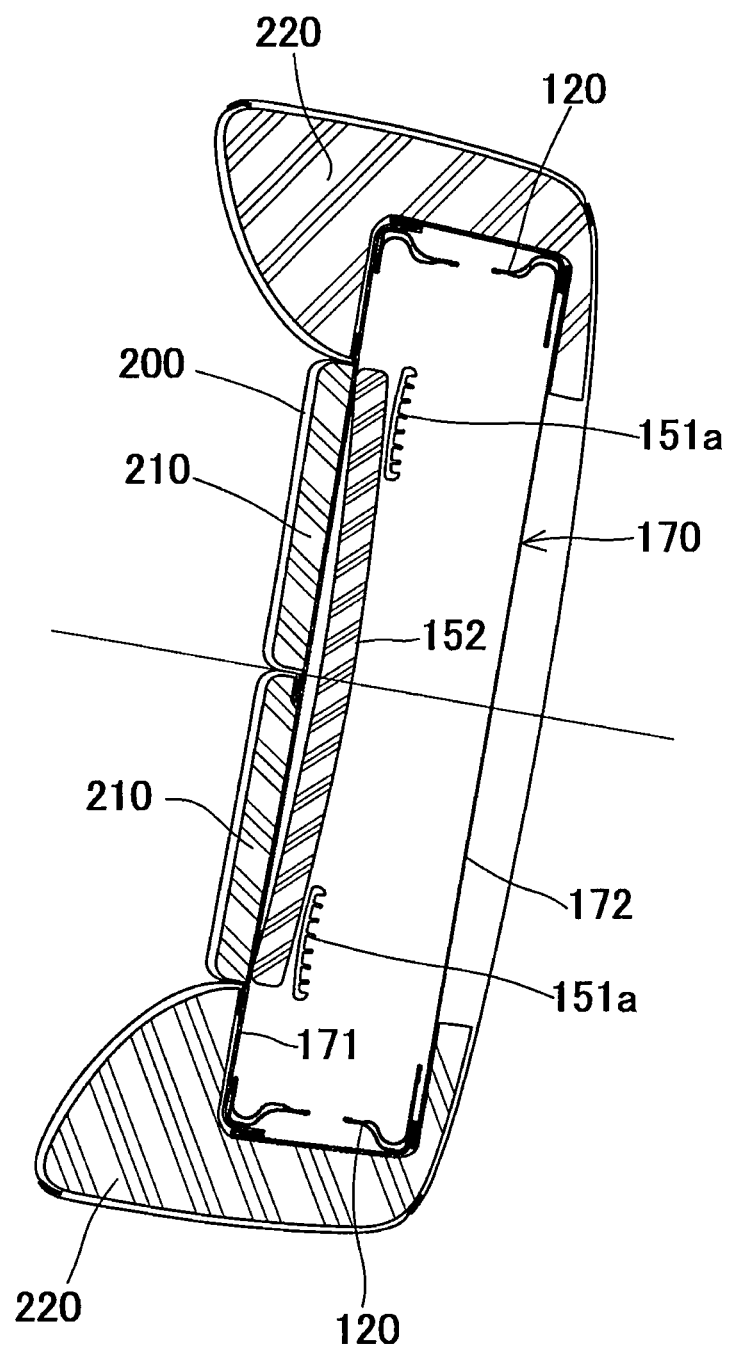
FIG. 6 is a sectional view along line B-B of FIG. 5.
Figure 7:
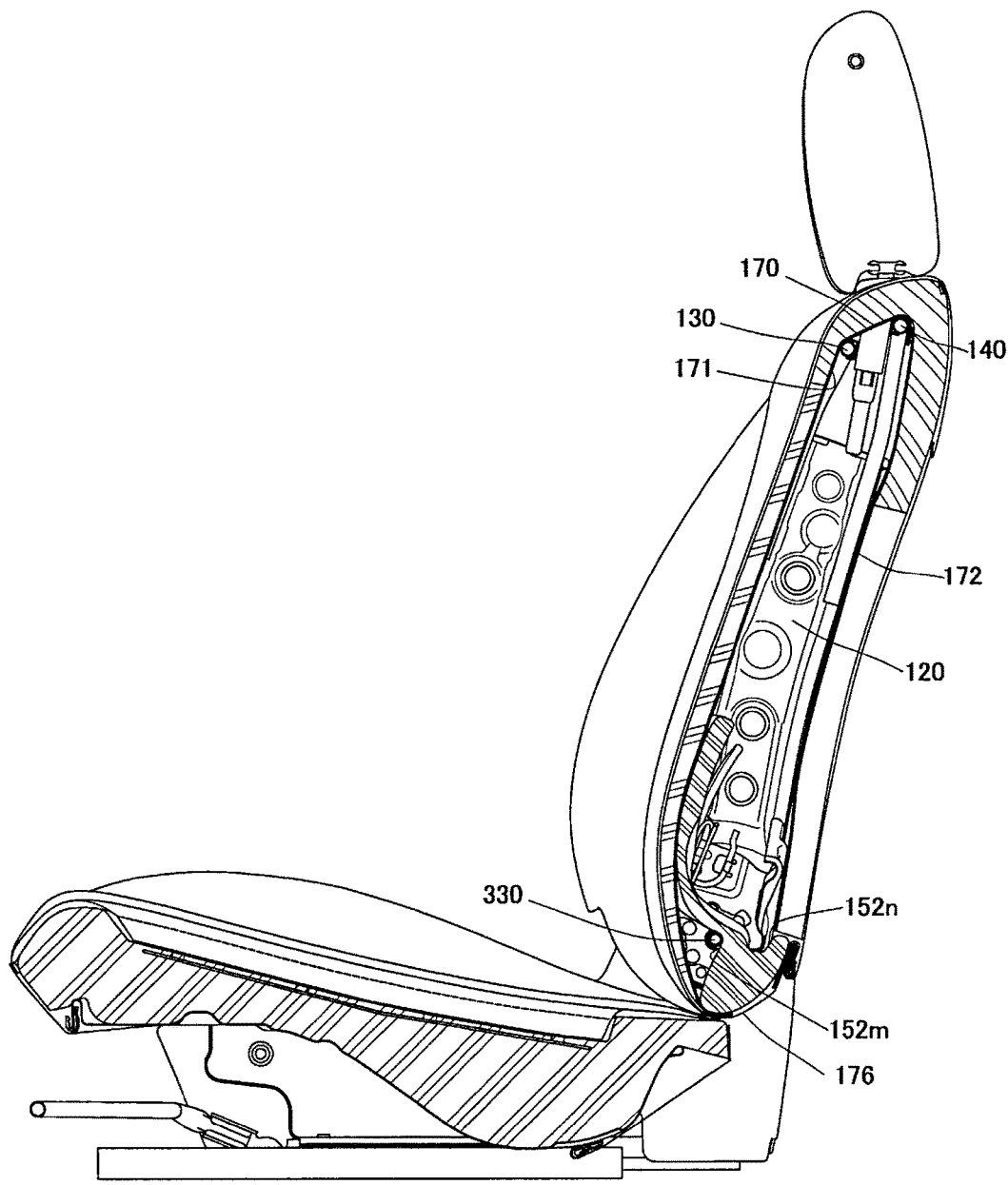
FIG. 7 is a sectional view along line A-A of FIG. 3.

On seat back portion (10), in a state where the base net for the back (170) is arranged in the abovementioned manner, although surface covering (200) (illustrated with an imaginary line in FIG. 1 and FIG. 2, etc.) is covered, between surface covering (200) and the base net for the back (170), pad (210) which for example uses slab urethane is arranged (refer to FIG. 6). Pad (210) is provided on both the left and right sides with the spine as its border, and through the gap between pads (210, 210) on the left and right, surface covering (200) and the base net for the back (170) are sewn. By having pad (210), it is possible to change concentrated loads to a dispersed load. In addition, side pads (220, 220) made of such as molded urethane, etc. which cover the outer surfaces of side frames (110, 120) from each edge on the outer side of pads (210, 210) and bulge in the frontwards direction on both sides of the seat occupant are arranged, and the outer surfaces of these are also covered with surface covering (200). By side pads (220, 220) being provided in such manner, posture supportability of the left and right directions of the seat occupant is increased.

According to the present embodiment, as seams (171a-171d, 171e-171h, 171i-171m) are formed on the base net for the back (170) configured of a three-dimensionally knitted fabric, pre-compression is applied along the line on which the seams are formed, and as residual stress is generated in the planar direction (the direction in which the fabric is stretched across) rigidity is partially increased and is made capable of supporting a human body having numerous uneven surfaces with a pressure that is close to being even. Accordingly, while exhibiting excellent body pressure dispersibility and posture supportability, as mentioned in the above, it is also possible to increase shock absorbency by utilizing the rupturing of threads that form the seams.

Test Example 1

In a diagonal direction in relation to the widthwise direction and the roll direction of a three-dimensionally knitted fabric with a thickness of 3 mm, seams were formed using a No. 8 thread made of polyester where then tensile tests were performed in the diagonal direction in which the seams were formed. Test was performed for a case where a single seam was formed and for a case where two seams were formed in a parallel manner with an interval of 2 cm. In addition, measurements were similarly taken for a case where a single strand of an elastic thread consisting of PTT fibers (polytrimethylene terephthalate) was used as the thread for forming the seams. Following this, these were compared against a case where no seams were formed at all. The results of these tests are illustrated in FIG. 11 and FIG. 12.

Figure 11:
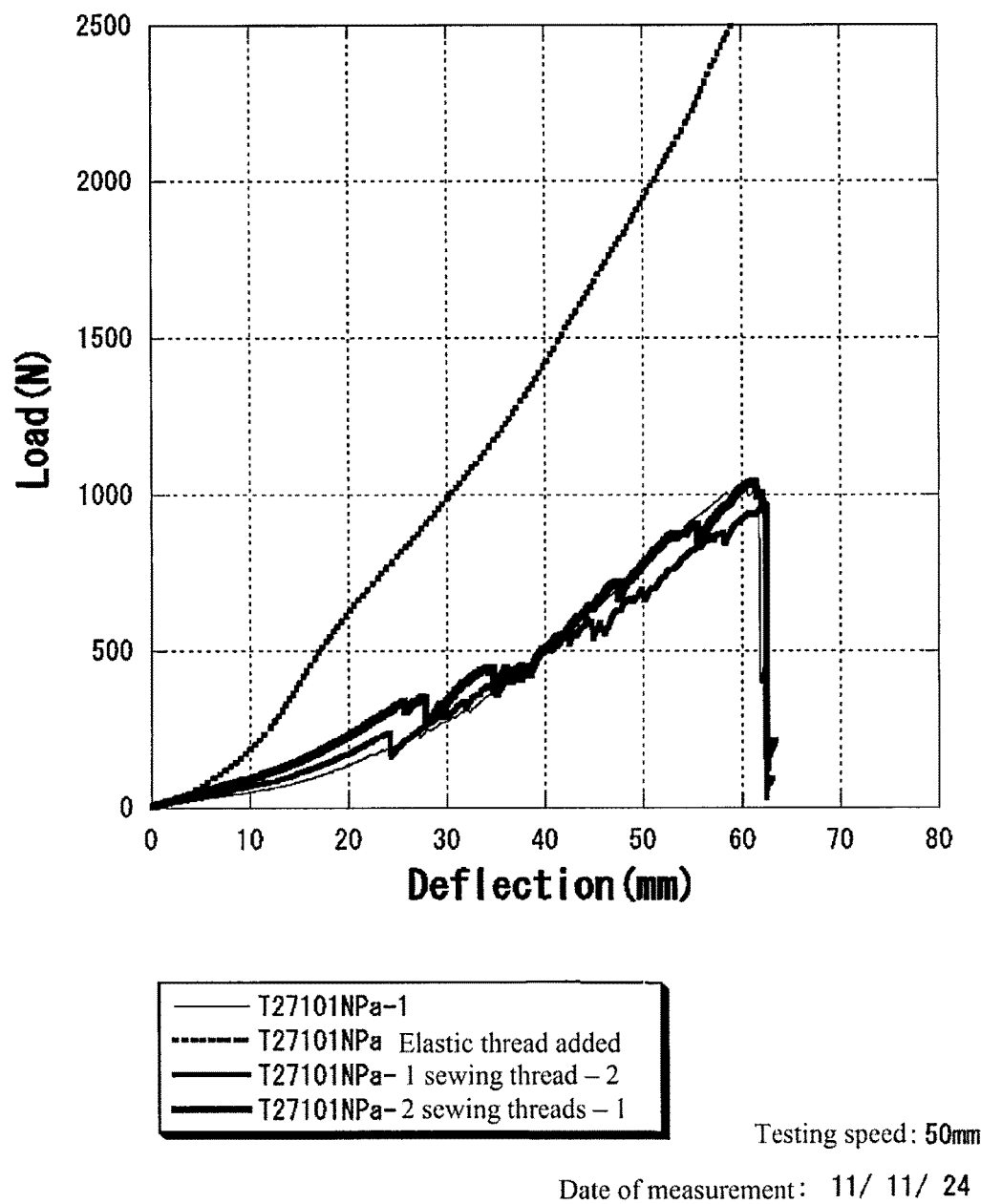
FIG. 11 is a graph that shows the results of the tensile test of Test Example 1.
Figure 12:
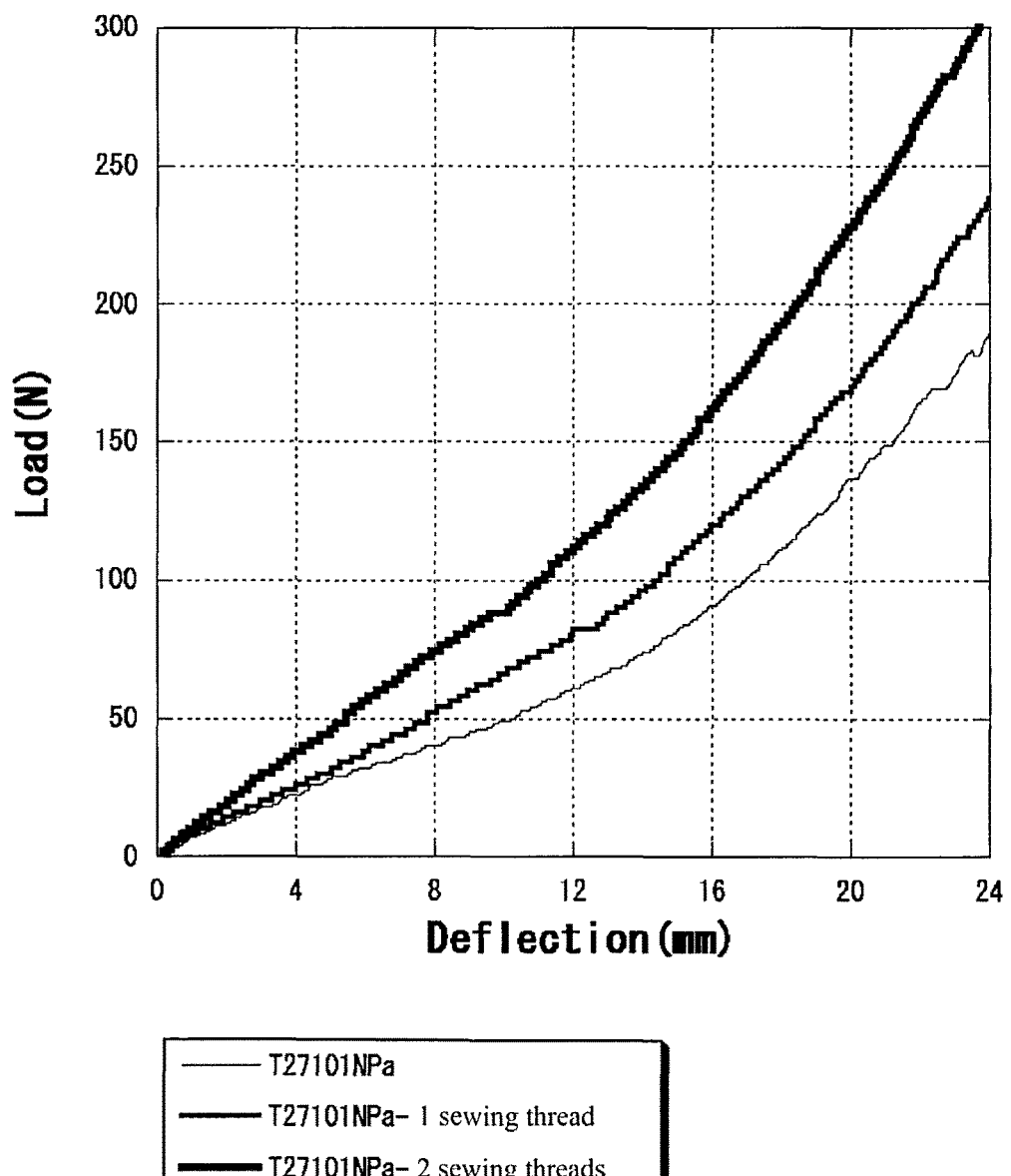
FIG. 12 is a graph in which the range of normal usage has been extracted from the results of the tensile test of Test Example 1.
Figure 13:
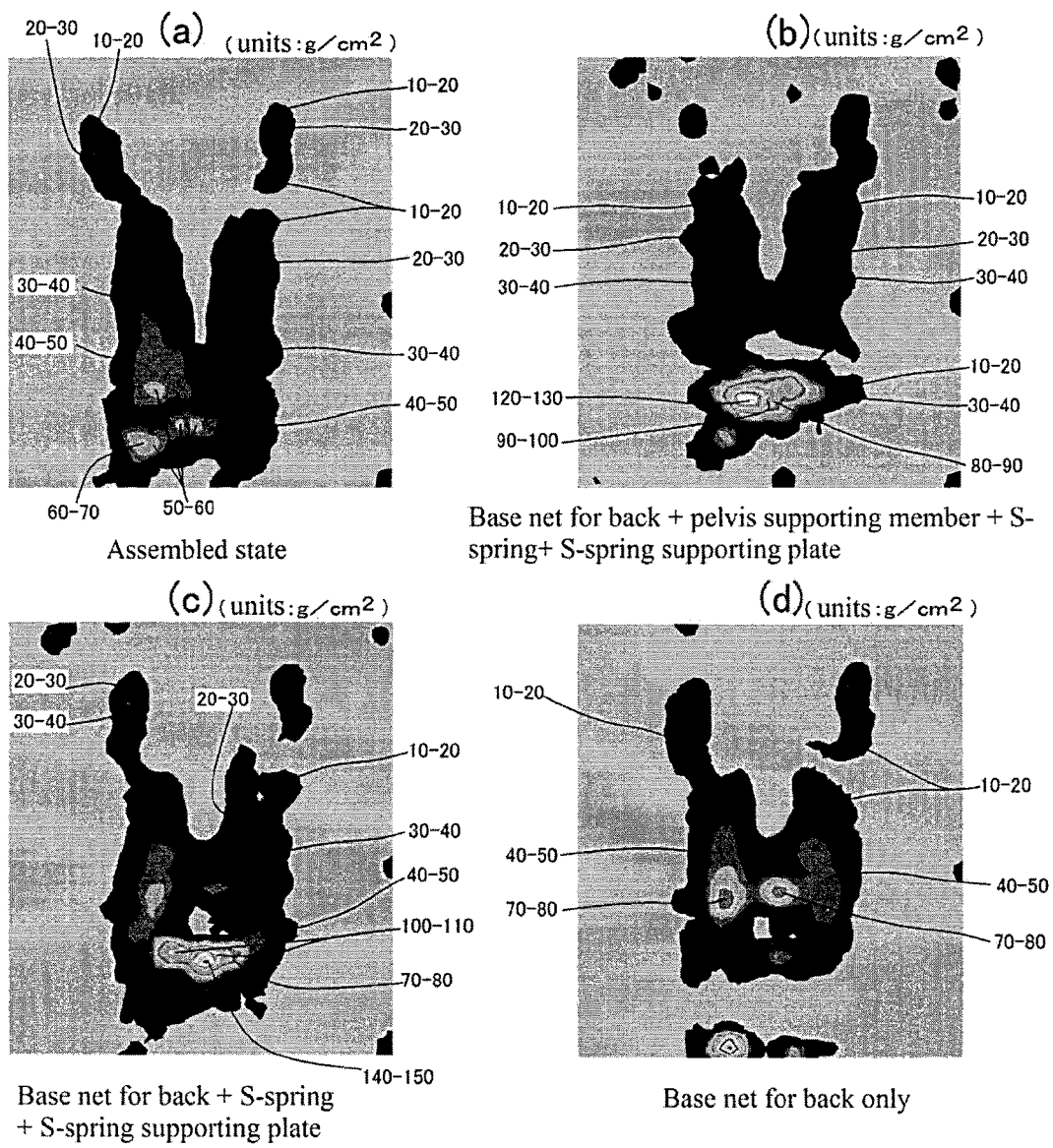
FIG. 13($a$)-($d$) are diagrams that show the measured results of the body pressure distribution of Test Example 2 using a base net for the back on which a substantially V-shaped seam has been formed.
Figure 14:
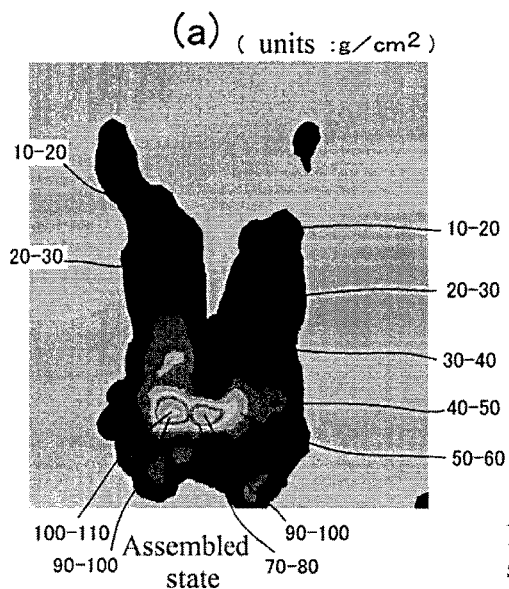
FIG. 14($a$)-($d$) are diagrams that show the measured results of the body pressure distribution of Test Example 2 using a base net for the back on which a substantially X-shaped seam has been formed.
Figure 14:
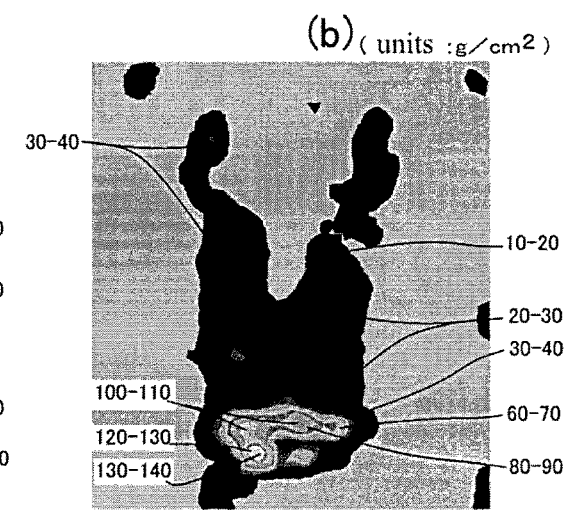
Figure 14:
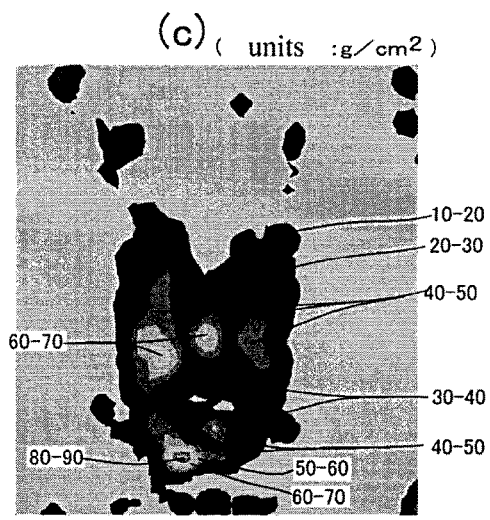
Figure 14:
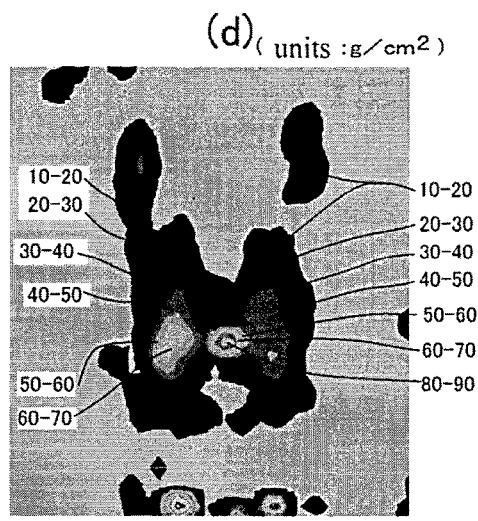
Figure 15:
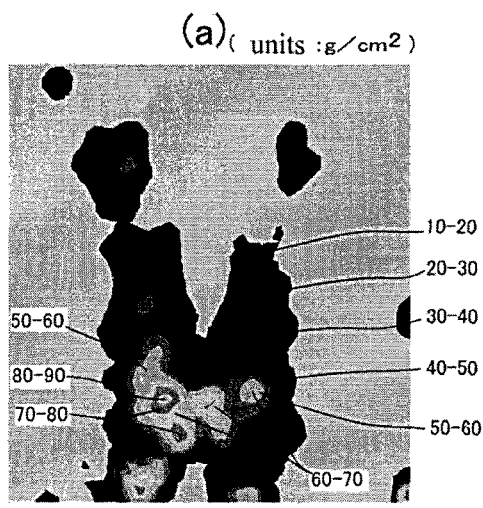
FIG. 15($a$)-($d$) are diagrams that show the measured results of the body pressure distribution of Test Example 2 using a base net for the back on which a substantially rhombic lattice-shaped seam has been formed.
Figure 15:
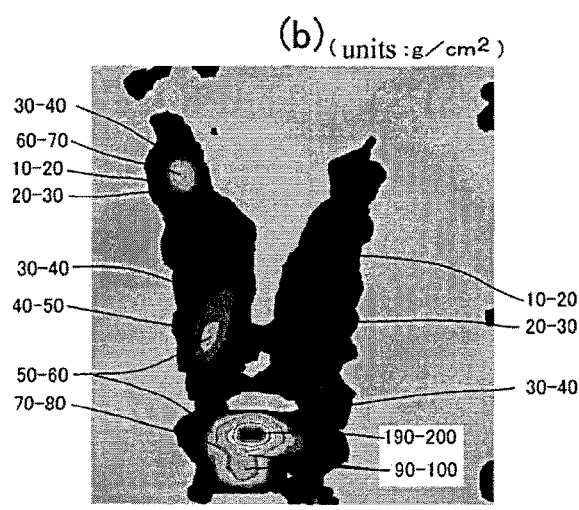
Figure 15:
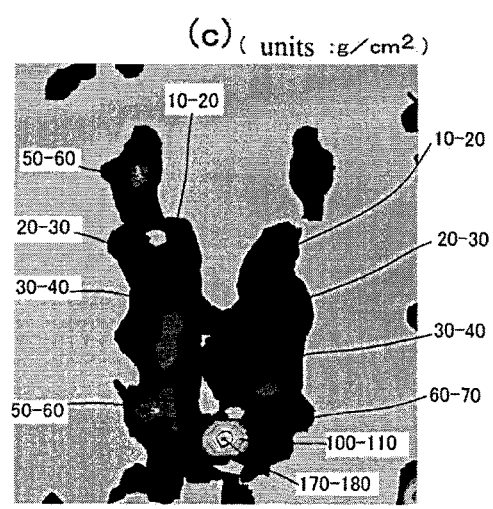
Figure 15:
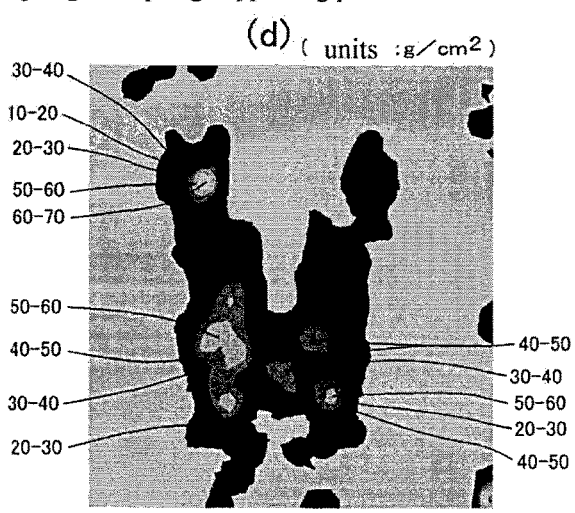
Figure 16:
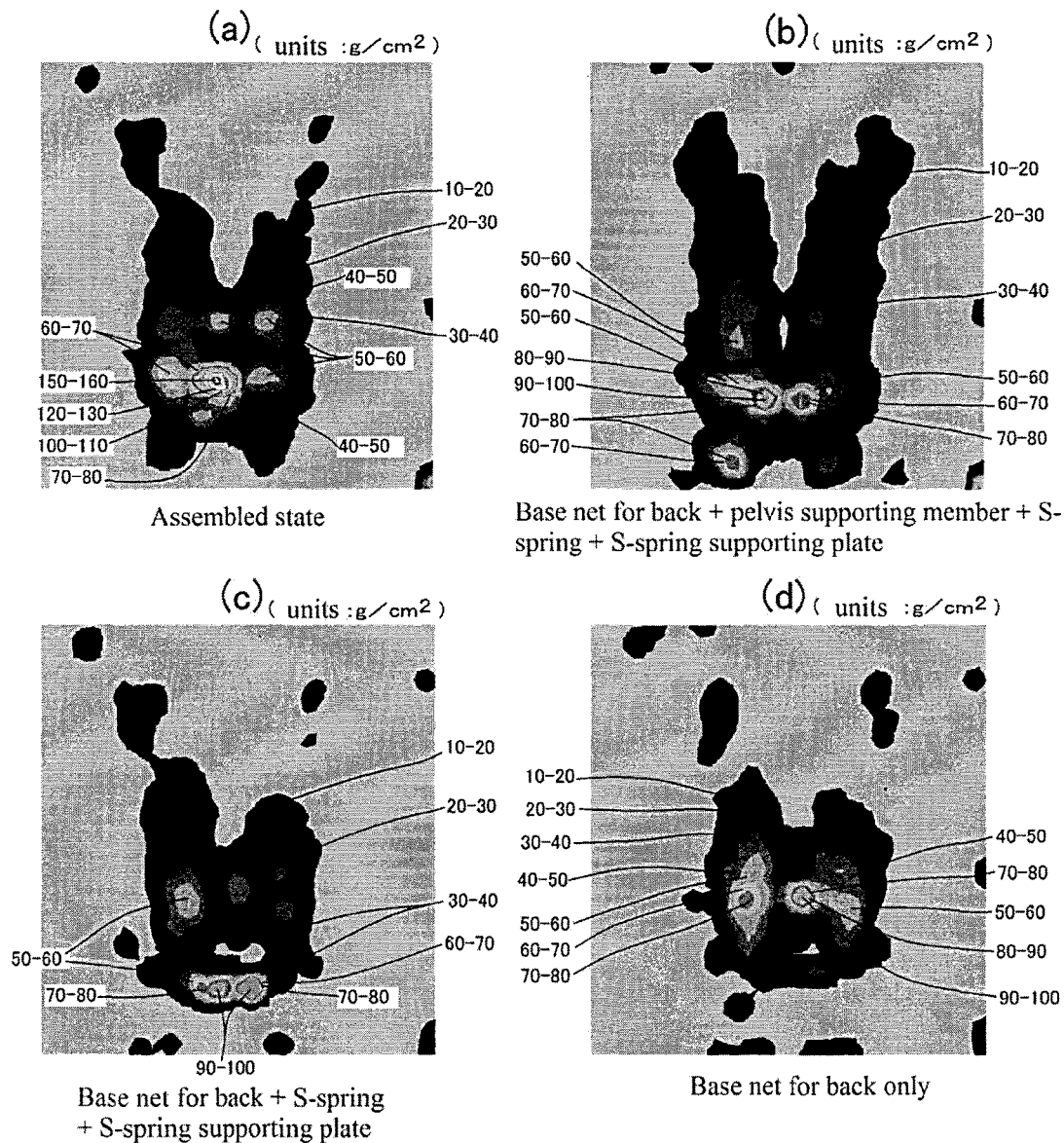
FIG. 16($a$)-($d$) are diagrams that show the measured results of the body pressure distribution of Test Example 2 using a base net for the back on which no seams have been formed.

In FIG. 11, in the case with the thread made of polyester (in the drawing, data labeled as "1 sewing thread-1" and "2 sewing threads-2"), although the tensile strength does not greatly differ regardless of whether seams have been formed, while those with which seams have been formed, in either case, have a greater increasing and decreasing variations of load values midway, with that with which seams were not formed, the increase takes a form that is similar to being linear. This is due to the effect of the rupturing of the threads that form the seam and indicates that energy absorbency is improved. Meanwhile, in the case with the elastic thread (in the drawing, labeled as "Elastic thread added") tensile strength had increased by approximately 2.5-fold. Accordingly, in cases when the strength is set to be further higher, it is preferable to form the seams with an elastic thread. In addition, as illustrated in FIG. 12, with the range of displacement during normal use (a range of up to approximately 25 mm), the strength of two sewing threads is the highest, which is then followed in order by a single sewing thread and then no sewing threads. From this, it can be understood that by providing a seam with a thread, in the range of normal use, it is possible to increase the strength of the diagonal direction.

Test Example 2

With the three-dimensionally knitted fabric having a thickness of 3 mm used in Test Example 1, body pressure dispersibility was each measured for a case where the substantially V-shaped seams (171a-171d) illustrated in FIG. 8 were formed, a case where the substantially X-shaped seams (171e-171h) illustrated in FIG. 9 were formed, a case where the substantially rhombic lattice-shaped seams (171i-171m) illustrated in FIG. 10 were formed, and a case where no seams were formed. The results of these tests are illustrated in FIG. 13 through FIG. 16.

It should be noted that (a) of each drawing is a case where one is seated in seat structure (1) in the completed form as illustrated in FIG. 1 through FIG. 7 where the base net for the back (170), S-spring (151), S-spring supporting plate (151a), pelvis supporting member (152), surface covering (200), slab urethane (210) and side pad (220), etc. are arranged on back frame (100), (b) of each drawing is a case where one is seated in a structure where the base net for the back (170), S-spring (151), S-spring supporting plate (151a), and pelvis supporting member (152) are arranged on back frame (100) but surface covering (200), slab urethane (210), and side pad (220) are not arranged thereon, (c) of each drawing is a case where one is seated in a structure where pelvis supporting member (152) is further missing and only the base net for the back (170), S-spring (151), and S-spring supporting plate (151a) are arranged on back frame (100), and (d) of each drawing is a case where one is seated in structure where only the base net for the back (170) is arranged on back frame (100). It should be noted that the seat occupant is a male subject in his 40's with a height of 172 cm and a weight of 56 kg.

First, when comparing the cases of the configurations with only the base net for the back (170) illustrated in (d) of each drawing, more than in the case of FIG. 16(d) where no seams are formed, it can be seen that in FIG. 13(d), FIG. 14(d), and FIG. 15(d), the supporting surface area near the shoulder blades is larger and body pressure dispersibility is increased. Of these, body pressure dispersibility is highest with the configuration of the substantially rhombic lattice-shaped seams illustrated in FIG. 15(d).

Furthermore, when comparing (b) and (c) of each drawing, although the supporting pressure is remarkably high near the section of the upper pelvis to the lumbar region with all of FIG. 13(b), (c), FIG. 14(b), (c), and FIG. 15(b), (c), it can be noticed that in the case where no seams were formed illustrated in FIG. 16(b), (c), the supporting pressure near the section of the upper pelvis to the lumbar region is lower than those listed above. In other words, when the base net for the back (170) provided with a seam is combined with S-spring, (151) and pelvis supporting member (152), etc., due to the rigidity of the base net for the back (170) increasing, it is possible to remarkably display supportability due to S-spring, (151) and pelvis supporting member (152), etc. near the section of the upper pelvis to the lumbar region.

Meanwhile, when comparing (a) of each drawing with each other, opposite to those mentioned above, while the supporting pressure near the section of the upper pelvis to the lumbar region is remarkably high in the case illustrated in FIG. 16(d) where no seams have been formed, with all of FIG. 13(a), FIG. 14(a), and FIG. 15(a), the supporting pressure near the section of the upper pelvis to the lumbar region is lower than the case illustrated in FIG. 16(d) where no seams have been formed. This is due to the fact that when no seams have been formed, as the rigidity is low, the supporting strength of the combination of the base net for the back (170), S-spring (151), and pelvis supporting member (152), etc. is weak, and for this reason, the load on surface covering (200) and slab urethane (210) becomes greater, the supporting pressure near the section of the upper pelvis to the lumbar region becomes remarkably greater, and thus in terms of body pressure dispersibility, becomes inferior to any of the cases where seams were provided on the base net for the back (170).

It should be noted that when FIG. 13(a), FIG. 14(a), and FIG. 15(a) where seams were provided are compared, in terms of body pressure dispersibility, it can be said that the configuration of FIG. 13(a) with substantially V-shaped seams has the least deviation of supporting pressure and is the best out of these.

From the abovementioned test example, by forming seams on the base net for the back (170), since the supporting strength of the section near the pelvis to the lumbar region can be increased, it makes it easier for the back muscles of the seat occupant to be extended naturally, it becomes easier for the stomach region to be kept soft, and the body sections other than around the pelvis are ensured freedom to be able to move. Accordingly, in a small space, namely inside a vehicle, it is possible to smoothly and freely change postures, smooth respiratory movements are promoted, and it is easier for the seat occupant to be brought to a relaxed state where parasympathetic nerves are predominant. In addition, while increasing the supporting strength near the pelvis to the lumbar region, as the supporting surface area near the shoulder blades is a large and soft supporting strength, it is easier for the antigravity muscles to be relaxed which leads to shaking of the head being suppressed and stability of the eye line thus enabling stable posture retention even in a moving environment where the vehicle is being driven.

Test Example 3

Comfort evaluation tests using physiological indices were performed in regard to whether or not it would be possible to guide a subject to a relaxed state where parasympathetic nerves are predominant. The subjects are two male subjects in their 70's (Subject A, B) having exemplary driving skills. Subject A drove a vehicle on which the seat structure illustrated in FIG. 1 through FIG. 8 (wherein the seams of the base net for the back (170) were substantially V-shaped as in FIG. 8 (hereinafter referred to as the "development seat")) was set in the driver's seat. Subject B performed driving with a structure, which is a driving cushion used by being placed on top of a seat and is provided with structures that perform functions similar to pelvis supporting member (152) and S-spring (151), etc. having placed on the front surface thereof a three-dimensionally knitted fabric provided with the substantially V-shaped seam illustrated in FIG. 8 with the surface thereof further covered with a surface covering (hereinafter referred to as the "body side cushion seat"), supported on the surface of the seat back portion of a common urethane seat.

In this test, sensors that detect the body surface pulse waves (APW) of the back region are embedded in the development seat and the back section of the body side cushion seat and changes in the APW while driving are measured. The results of these are expressed as a physical condition mapping and a sensory response mapping by means of a quantifying method proposed by the present applicant as Japanese Unexamined Patent Application Publication No. 2011-108909. In these, the collected APW are frequency analyzed, and in regard to sections subject to analysis, analysis waveforms are represented on a double logarithmic axis display where then these analysis waveforms are separated in to a low-frequency band, mid-frequency band, and high frequency band, and then based on the tilt of the classified analysis waveform and the shape of the overall analysis waveform, the analysis waveforms are assigned points based on a certain set of standards for these to be plotted as coordinates. The physical condition mapping represents the status of the control of the autonomic nervous system as a balance of sympathetic nerves and parasympathetic nerves and the sensory response mapping represents the situation of changes to the heart rate superimposed to the physical condition mapping. Although FIG. 17 and FIG. 18 are the results of these tests, in either case, the interval of time of the analysis section from the starting point to the first point is approximately 40 minutes, ant the interval of time thereafter is approximately 10 minutes.

Figure 17:
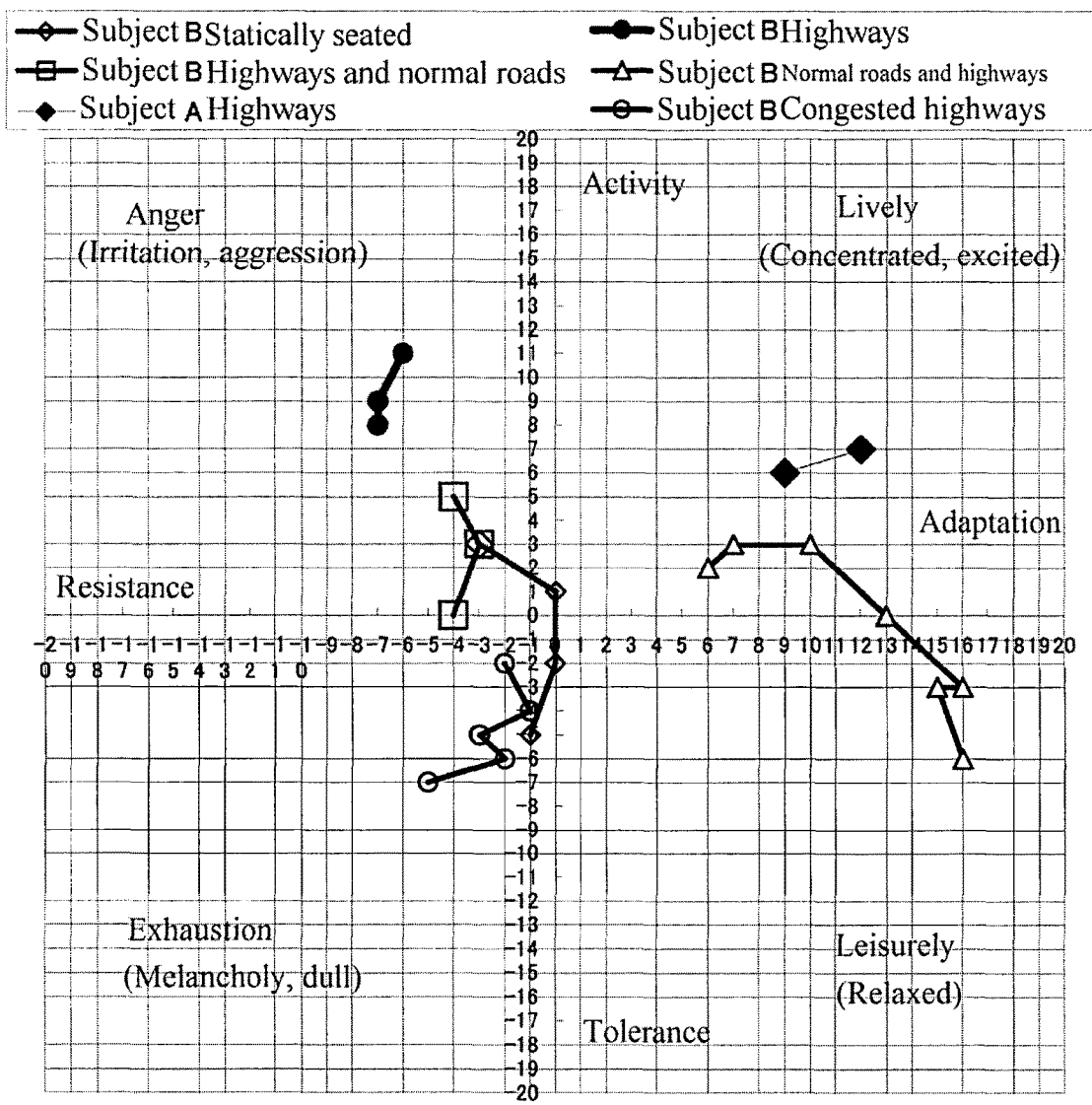
FIG. 17 is a graph showing the physical condition mapping of Test Example 3.
Figure 18:
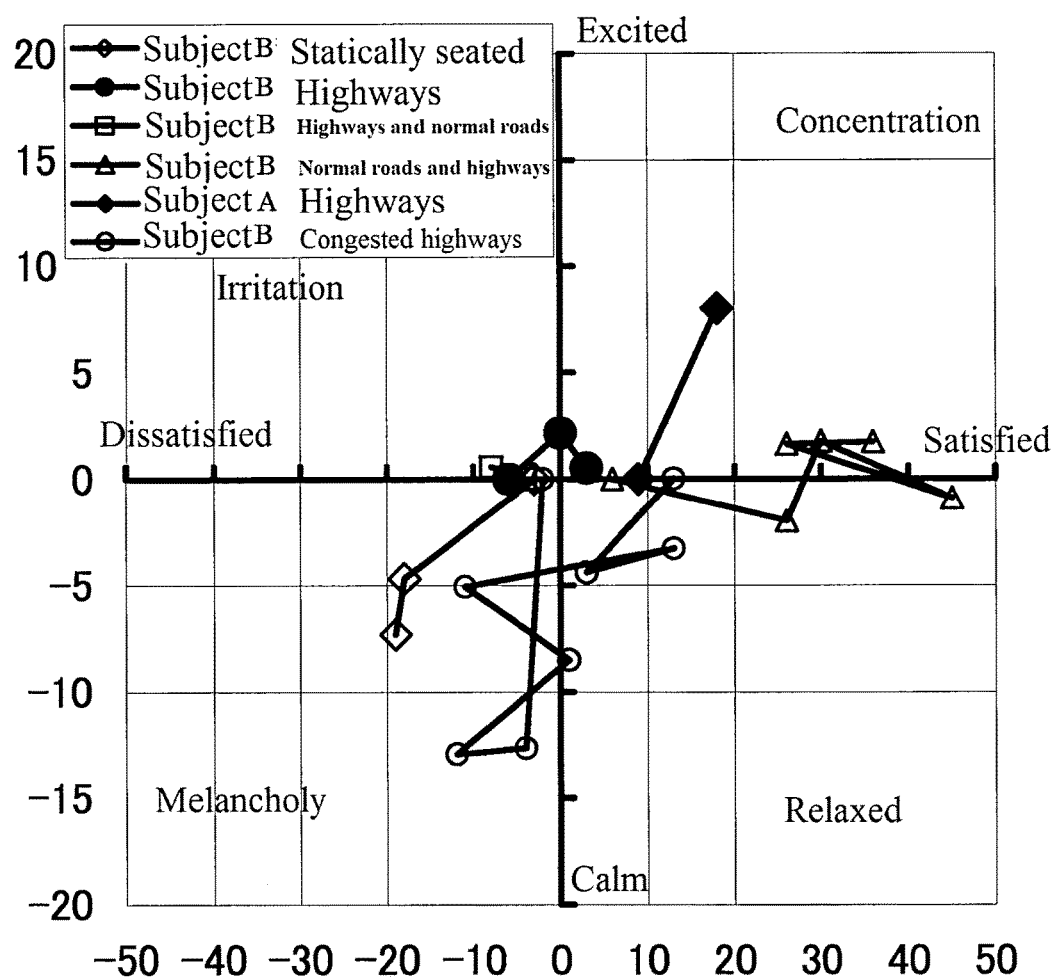
FIG. 18 is a graph showing the sensory response mapping of Test Example 3.

From FIG. 17 and FIG. 18, with Subject A who used the development seat, his physical condition maintained a lively state throughout and increased adaptability while with his sensory response, concentration gradually increased. From this, it can be presumed that Subject A has the nature of displaying a continuous concentration and thus it can be determined that the development seat is one that at least does not interfere with maintaining physical conditions and increasing concentration.

With Subject B who used the body side cushion seat, his physical condition became inactive when starting to drive, and a tendency could be seen where sensory responses were calmed down to reduce energy consumption. There is the possibility that this tendency was promoted by the characteristic of the body side cushion seat. However, in the event that a traffic jam was encountered on the highway, from how sensory responses were suddenly calmed down and afterwards actively switched between being satisfied and dissatisfied, it can be presumed that Subject B has the nature of getting bored easily yet displaying instantaneous concentration, and the possibility that this led to the tendency of reducing energy consumption can also be taken into consideration.

Test Example 4

Vibration tests were performed for the seat structure illustrated in FIG. 1 through FIG. 8 (wherein the seams of the base net for the back (170) were substantially V-shaped as in FIG. 8 (hereinafter referred to as the "development seat")). At this time, the tests were performed while changing the attached position of S-spring supporting plate (151a) of S-spring (151) based on three setting conditions. The first setting conditions (body side support conditions) is a case where center of S-spring supporting plates (151a, 151a) on the left and right are attached to a position separated from side frames (110, 120) by 85 mm each towards the center line of the base net for the back, and the second setting conditions (inner side conditions) is a case where similarly the attachment is made at a position separated by 115 mm towards the center line (equivalent to the position of the center of gravity of the back of the seat occupant). The third setting conditions (body side support+center support conditions) is a case where two S-spring supporting plates (151a, 151) are placed similarly to the first setting conditions and a third S-spring supporting plate (151a) is additionally placed at the center of both. It should be noted that the seat frame, consisting of back frame (100) and the cushion frame which configure the seat structure, used was one with a natural frequency of 45 Hz according to a hammering test. This is based on the knowledge of the present inventors that by setting the natural frequency of the seat frame to 40-50 Hz and making it difficult for vibrations from the frame to be transmitted, and by increasing the damping ratio of the cushion material supporting the shoulder region which serves as the fulcrum of movements and reducing the bottoming feel, weight can be relieved on the seat frame, it becomes easier to move the lumbar region in the forwards and backwards directions, and the forwards and backwards movement generated onto the shoulder region and head can be suppressed.

In this test, the seat for a vehicle was mounted on an vibration exciter of only the vertical direction, where then the vertical acceleration on the vibration exciter and the acceleration of the front-rear direction of the upper section of the seat back portion of the development seat were measured. The terms for the input consisted of a frequency band of 0.5-25 Hz and vibrations in the vertical direction by means of a sine wave log sweep with an amplitude of 0.5 mm.

Figure 19:
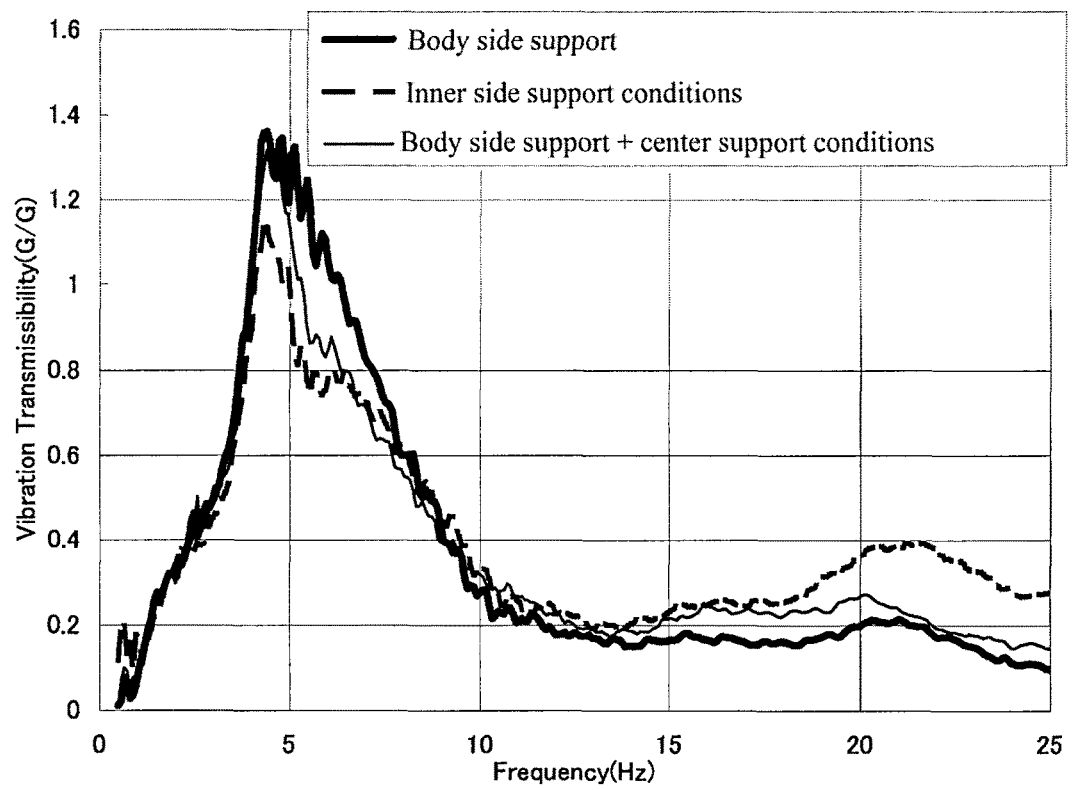
FIG. 19 is a graph showing the vibration transmissibility of Test Example 4.

From FIG. 19, compared to the body side support conditions, with the inner side conditions, although transmissibility with the resonant frequency band around 5 Hz was decreased, transmissibility with the high-frequency band of 15 Hz and above was increased creating what could be referred to as a bulky feel. Although the results are similar with the body side support+center support conditions, this tendency is less than with the inner side conditions. From these results, it can be understood that the body side support conditions are the most suitable for lumbar region support. In other words, it is preferable to configure the point of action, of the motion of pelvis supporting member (152) for which S-spring supporting plate (151a) is the point of action, to be offset, as with the first setting conditions (body side support conditions), towards the outer side by approximately 30 mm from the position of the center of gravity of the back of the seat occupant. It should be noted that this similarly applies to cases when rigidity is to be increased by forming seams in the base net for the back (170) and it is preferable that the seams which are substantially V-shaped, substantially X-shaped, and substantially rhombic lattice-shaped, etc. are provided to especially increase the surface rigidity in the position similar to this, or in other words, the position offset towards the outer side by approximately 30 mm from the position of the center of gravity of the back of the seat occupant.

Although an example where a seam is provided on the base net for the back (170) is explained in the above, it is also possible to provide seam (310a) on base net (310) (hereinafter referred to as the "base net for the cushion") which is supported by cushion frame (300) of seat cushion portion (30).

Figure 20:
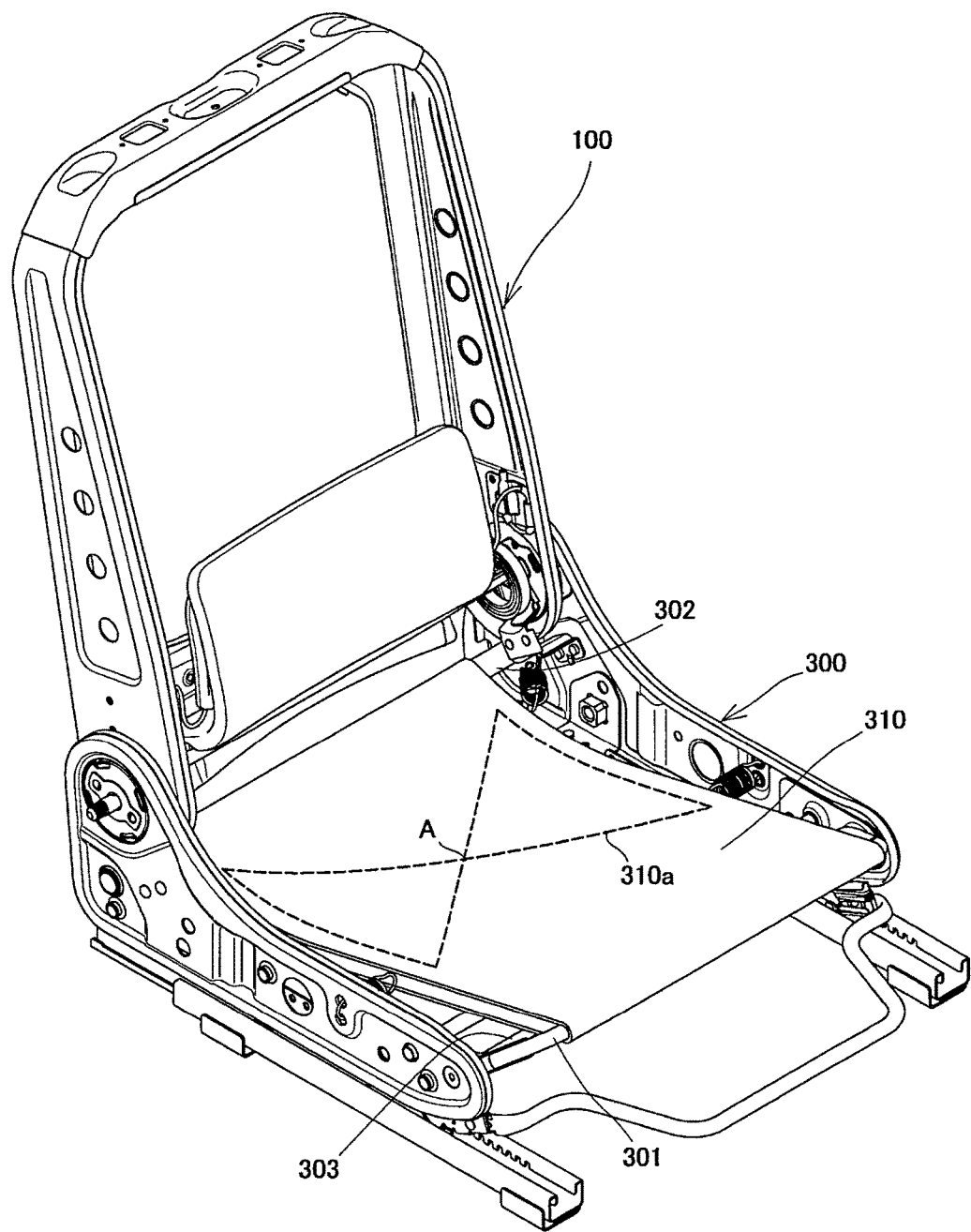
FIG. 20 is a drawing for explaining another embodiment of the present invention in which a seam is formed near the section of the base net for the cushion that supports the ischial tuberosity.

Here, the base net for the cushion (310) is, for example, as illustrated in FIG. 20, laid across supporting frames (301, 302) of the front and back which configure cushion frame (300). In addition, at least one of these or namely supporting frame (301) of the front side in the example illustrated in FIG. 20 is provided to be capable of elastically moving back and forth by means of torsion bar (303). Accordingly, when a person is seated on seat cushion portion (30), the base net for the cushion (310) sinks in centered on the section near the ischial tuberosity, and due to the elasticity of torsion bar (303) supporting frame (301) of the front side rotates backwards and is supported by a point of equilibrium. Due to vibrations from the floor that are input while driving, supporting frame (301) of the front side elastically moves back and forth thus absorbing the vibrations.

In order for the base net for the cushion (310) to realize such function, it is necessary to be capable of securely supporting the seat occupant form underneath the buttocks. For this reason, in forming seam (310a) in the base net for the cushion (310), it is preferable that such is provided in a position that includes a certain range where section A which supports the ischial tuberosity is its substantial center. In particular, it is further preferable that this is formed to include a range of a diameter of 200 mm with section A which supports the ischial tuberosity as its substantial center. Due to this, the surface rigidity of the section which supports the buttocks centered near the ischial tuberosity is increased, the supporting strength is also increased, and the bottoming feel when being seated can be reduced.

Figure 21:
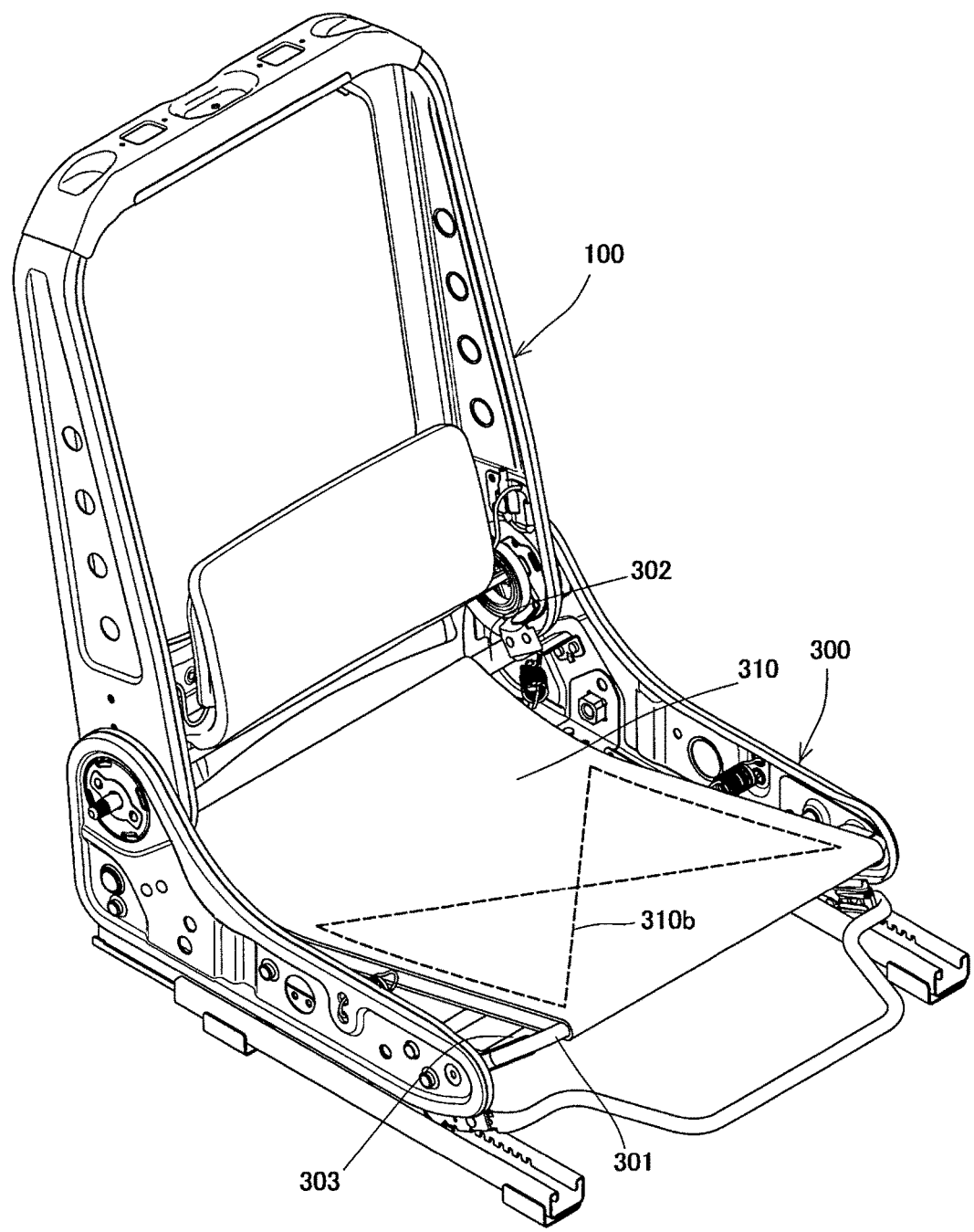
FIG. 21 is a drawing for explaining yet another embodiment of the present invention in which a seam is formed near the section of the base net for the cushion that supports the thigh region.

In addition, it is also possible to have a configuration where on the base net for the cushion (310), as illustrated in FIG. 21, seam (310b) is formed in the section which supports the thigh region (more towards the front than the center of the base net for the cushion (310) in the front-rear direction). Also with this configuration, while suppressing great sinking when being seated and contributing to a reduction of the bottoming feel, it is possible to serve as a barrier preventing the buttocks from moving forwards due to vibrations, etc. while driving or to being seated for a long time and improve the stability of the seating posture. In addition, although either one of seam (310a) provided near the ischial tuberosity or seam (310b) provided near the thigh region will each independently realize the abovementioned functions, it is of course possible for both of these to be provided.

It should be noted that it is preferable that seams (310a, 310b), similarly to the abovementioned embodiment, have at least one line formed in a diagonal direction on the base net for the cushion (310), and this may also be formed to be substantially V-shaped, substantially X-shaped, or substantially rhombic lattice-shaped, etc. In addition, as illustrated in FIG. 20 and FIG. 21, if seams (310a, 310b) are of a shape capable of being formed in a unicursal manner such as where the vertices of two triangles are matched up against each other when viewed from the upper surface, as mentioned in the above, the seam can be easily formed with an automated sewing machine and further contribute to a reduction of costs.

INDUSTRIAL APPLICABILITY

Although the abovementioned explanation illustrates a case where the present invention has been applied to the seat of a vehicle such as a car, the application is not limited to such and may also be applied to office chairs and sofas for use as home furniture.

REFERENCE SIGN LIST

1 Seat structure
10 Seat back portion
100 Back frame
110, 120 Side frame
130 First upper frame
140 Second upper frame
150 Lower frame
151 S-spring
151a S-spring supporting plate
152 Pelvis supporting member
170 Base net for the back
171a-m Seam
30 Seat cushion portion
300 Cushion frame
310 Base net for the cushion
310b, 310b Seam

The invention claimed is:

1. A base net covered by a surface layer cushion in the seat back portion or seat cushion portion of a seat structure and supported by being stretched across a back frame or a cushion frame, wherein the base net comprises
    a three-dimensionally knitted fabric formed by joining a pair of grand knitted fabrics placed separately apart from each other with a connecting yarn; and
    two or more sets of two substantially parallel sewn seams, which seams bring the pair of grand knitted fabrics sandwiching said connecting yarn closer to each other in a thickness direction,
    wherein a certain pre-compression is applied in the thickness direction due to said seams, to generate residual stress in the direction in which the base net is stretched across, and
    wherein the two or more sets of two substantially parallel sewn seams intersect in at least one point, which one point is surrounded on four sides by the seams.

2. A base net according to claim 1 wherein, said seam is provided at a position which includes the section that supports a region from a pelvis to a lumbar and the base net is supported by being stretched across said back frame.

3. A base net according to claim 1 wherein, said seam is provided in at least one of a position that includes a certain range where the substantial center thereof is the section supporting the ischial tuberosity and a position that supports the thigh region and the base net is supported by being stretched across said cushion frame.

4. A base net according to claim 1 wherein, said seam is provided in and along the diagonal direction in relation to the widthwise direction and the roll direction of said three-dimensionally knitted fabric.

5. A base net according to claim 1 wherein, said two or more sets of two substantially parallel seams are formed in substantially V-shaped, substantially X-shaped, or substantially rhombic lattice-shaped.

6. A base net according to claim 1 wherein, the thread which forms said seam is an elastic thread.

7. A seat structure comprising a seat back portion and a seat cushion portion,
    comprising the base net according to claim 2 supported by being stretched across the back frame of said seat back portion.

8. A seat structure according to claim 7 having, in the rear side of the base net which is stretched across the back frame of said seat back portion, a planar spring member laid across the widthwise direction in a position that is lower than the center portion of said back frame in the vertical direction.

9. A seat structure according to claim 8 comprising a front surface cover unit that covers the front surface of said planar spring member and further having a pelvis supporting member which is elastically supported by said planar spring member.

10. A seat structure according to claim 9 wherein, a supporting plate which supports said pelvis supporting member with a surface and is also the point of action of the rotary motion of said pelvis supporting member is provided on said planar spring member with certain intervals on the left and right sides of the center line of said seat back portion.

11. A seat structure comprising a seat back portion and a seat cushion portion,
    comprising the base net according to claim 3 supported by being stretched across the back frame of said seat back portion.

* * * * *